US012794526B2

(12) United States Patent
Yang et al.

(10) Patent No.: US 12,794,526 B2
(45) Date of Patent: Nov. 10, 2026

(54) ENHANCEMENT OF USER EQUIPMENT (UE) SELECTION FOR UPLINK AGGREGATION

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 333 days.

(21) Appl. No.: 18/415,058

(22) Filed: Jan. 17, 2024

(65) Prior Publication Data

US 2025/0233627 A1 Jul. 17, 2025

(51) Int. Cl.

*H04B 7/06* (2006.01)
*H04L 1/1607* (2023.01)
*H04W 48/18* (2009.01)
*H04W 72/231* (2023.01)

(52) U.S. Cl.

CPC ......... *H04B 7/0617* (2013.01); *H04L 1/1642* (2013.01); *H04W 48/18* (2013.01); *H04W 72/231* (2023.01)

(58) Field of Classification Search

CPC .. H04B 7/0617; H04W 72/231; H04W 48/18; H04L 1/1642

See application file for complete search history.

(56) References Cited

U.S. PATENT DOCUMENTS

2013/0297609 A1* 11/2013 Liu .......................... G06F 16/22 707/737
2014/0105046 A1* 4/2014 Tellado ................. H04W 24/08 370/252
2014/0376459 A1* 12/2014 Kanamarlapudi .... H04W 72/04 370/329
2016/0261327 A1* 9/2016 Merlin .................. H04L 5/0057
2016/0330755 A1* 11/2016 Ding ................. H04W 52/0216
2017/0331670 A1* 11/2017 Parkvall .............. H04L 41/0233
2018/0020428 A1* 1/2018 Madhavan ............ H04W 72/02
2018/0146478 A1* 5/2018 Kim ....................... H04W 72/23
2018/0310283 A1* 10/2018 Deenoo ................. H04L 5/0048
2019/0068335 A1* 2/2019 Li ..................... H04W 72/0446

(Continued)

*Primary Examiner* — Jael M Ulysse

(74) *Attorney, Agent, or Firm* — Holland & Hart LLP /Qualcomm

(57) ABSTRACT

Methods, systems, and devices for wireless communications are described. A first user equipment (UE) may receive, from a network entity, a spatial separation indication that indicates, for each of one or more second UEs, a spatial separation between the first UE and each respective second UE. The first UE may forward first data to a selected second UE of the one or more second UEs, where the first data is forwarded as part of an uplink UE aggregation procedure that is based on the spatial separation indication. The first and second UEs may each transmit, to the network entity, a respective shared channel transmission in overlapping or non-overlapping resources that includes respective data, an aggregation flag, and a sequence number, where the aggregation flag and the sequence number are indicative that the first and second data are to be aggregated in a sequence order.

20 Claims, 14 Drawing Sheets

(56) References Cited

U.S. PATENT DOCUMENTS

| | | | | |
|---|---|---|---|---|
| 2019/0357240 | A1* | 11/2019 | Kim | H04L 27/2678 |
| 2020/0163140 | A1* | 5/2020 | Mochizuki | H04L 5/001 |
| 2020/0274656 | A1* | 8/2020 | Gordaychik | H04L 1/0013 |
| 2020/0313747 | A1* | 10/2020 | Xu | H04W 16/28 |
| 2020/0359330 | A1* | 11/2020 | Zacharias | H04W 52/146 |
| 2021/0029635 | A1* | 1/2021 | Meylan | H04W 72/21 |
| 2021/0105808 | A1* | 4/2021 | Lei | H04L 5/0051 |
| 2021/0259010 | A1* | 8/2021 | Yang | H04W 72/23 |
| 2022/0007208 | A1* | 1/2022 | Zhou | H04B 7/0617 |
| 2022/0030519 | A1* | 1/2022 | Zhou | H04W 4/021 |
| 2022/0109551 | A1* | 4/2022 | Bai | H04L 5/0096 |
| 2022/0150173 | A1* | 5/2022 | Billuri | H04W 28/10 |
| 2022/0224407 | A1* | 7/2022 | Shrestha | H04B 7/18539 |
| 2022/0278730 | A1* | 9/2022 | Tsui | G06N 20/00 |
| 2022/0279535 | A1* | 9/2022 | Tsui | G06N 20/00 |
| 2022/0361276 | A1* | 11/2022 | Jeon | H04W 28/0278 |
| 2022/0376823 | A1* | 11/2022 | Vagner | H04W 40/24 |
| 2023/0189389 | A1* | 6/2023 | Hui | H04L 1/1812<br>370/329 |
| 2023/0292335 | A1* | 9/2023 | Park | H04B 7/0404 |
| 2023/0370135 | A1* | 11/2023 | Haustein | H04B 7/0617 |
| 2024/0008019 | A1* | 1/2024 | Kim | H04W 72/231 |
| 2024/0063992 | A1* | 2/2024 | Esswie | H04W 72/1273 |
| 2024/0195572 | A1* | 6/2024 | Niu | H04L 5/0048 |
| 2025/0261232 | A1* | 8/2025 | Hui | H04W 72/0446 |
| 2026/0040298 | A1* | 2/2026 | Rao | H04W 72/11 |

* cited by examiner

ENHANCEMENT OF USER EQUIPMENT (UE) SELECTION FOR UPLINK AGGREGATION

FIELD OF TECHNOLOGY

The following relates to wireless communications, including enhancement of user equipment (UE) selection for uplink aggregation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a UE may communicate with a network entity. For instance, the UE may transmit data stored in a buffer to the network entity. As an amount of data in the buffer increases, an amount of time for the UE to transmit the data of the buffer to the network entity may also increase. Techniques that enable a UE to reduce an amount of data in the buffer may correspondingly be associated with decreased latency and may increase the efficiency of wireless communications between the UE and the network entity.

SUMMARY

The described techniques relate to improved methods, systems, devices, and apparatuses that support enhancement of user equipment (UE) selection for uplink aggregation. For example, the described techniques provide for a first UE to reduce an amount of latency associated with selecting one or more second UEs for uplink aggregation by utilizing a spatial separation indication provided by the network entity to the first UE. The first UE may receive, from the network entity, the spatial separation indication that indicates, for each of the one or more second UEs, a spatial separation between the first UE and each respective second UE. The first UE may forward first data to a selected second UE of the one or more second UEs, where the first data is forwarded as part of an uplink UE aggregation procedure that is based on the spatial separation indication. The first UE may transmit, to the network entity and as part of the uplink UE aggregation procedure, a shared channel transmission that includes second data and an aggregation flag, where the aggregation flag is indicative that the second data is to be aggregated with the first data.

A method for wireless communications by a first user equipment (UE) is described. The method may include receiving, from a network entity, a spatial separation indication that indicates, for each of one or more second UEs, a spatial separation between the first UE and each respective second UE, forwarding first data to a selected second UE of the one or more second UEs, where the first data is forwarded as part of an uplink UE aggregation procedure that is based on the spatial separation indication, and transmitting, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order.

A first UE for wireless communications is described. The first UE may include one or more memories storing processor executable code, and one or more processors coupled with the one or more memories. The one or more processors may individually or collectively operable to execute the code to cause the first UE to receive, from a network entity, a spatial separation indication that indicates, for each of one or more second UEs, a spatial separation between the first UE and each respective second UE, forward first data to a selected second UE of the one or more second UEs, where the first data is forwarded as part of an uplink UE aggregation procedure that is based on the spatial separation indication, and transmit, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order.

Another first UE for wireless communications is described. The first UE may include means for receiving, from a network entity, a spatial separation indication that indicates, for each of one or more second UEs, a spatial separation between the first UE and each respective second UE, means for forwarding first data to a selected second UE of the one or more second UEs, where the first data is forwarded as part of an uplink UE aggregation procedure that is based on the spatial separation indication, and means for transmitting, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order.

A non-transitory computer-readable medium storing code for wireless communications is described. The code may include instructions executable by one or more processors to receive, from a network entity, a spatial separation indication that indicates, for each of one or more second UEs, a spatial separation between the first UE and each respective second UE, forward first data to a selected second UE of the one or more second UEs, where the first data is forwarded as part of an uplink UE aggregation procedure that is based on the spatial separation indication, and transmit, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order.

Some examples of the method, first user equipment (UEs), and non-transitory computer-readable medium described herein may further include operations, features, means, or instructions for determining that a quantity of data in an uplink buffer of the first UE satisfies a threshold quantity, where forwarding the first data may be based on determining that the quantity of data in the uplink buffer satisfies the threshold quantity.

Some examples of the method, first user equipment (UEs), and non-transitory computer-readable medium described herein may further include operations, features, means, or instructions for transmitting, to the network entity, an indication that a quantity of data in an uplink buffer of the first UE satisfies a threshold quantity, where receiving the spatial separation indication may be based on transmitting the indication that the quantity of data in the uplink buffer of the first UE satisfies the threshold quantity.

In some examples of the method, first user equipment (UEs), and non-transitory computer-readable medium described herein, the quantity of data in the uplink buffer satisfying the threshold quantity includes the quantity of data in the uplink buffer exceeding the threshold quantity.

Some examples of the method, first user equipment (UEs), and non-transitory computer-readable medium described herein may further include operations, features, means, or instructions for selecting the selected second UE from the one or more second UEs based on the spatial separation indication and establishing a communication link with the selected second UE based on selecting the selected second UE.

Some examples of the method, first user equipment (UEs), and non-transitory computer-readable medium described herein may further include operations, features, means, or instructions for transmitting, to the network entity, an uplink UE aggregation request based on the spatial separation indication, where transmitting the shared channel transmission may be based on transmitting the uplink UE aggregation request.

Some examples of the method, first user equipment (UEs), and non-transitory computer-readable medium described herein may further include operations, features, means, or instructions for receiving an aggregation configuration from the network entity based on transmitting the uplink UE aggregation request, where transmitting the shared channel transmission may be based on receiving the aggregation configuration.

In some examples of the method, first user equipment (UEs), and non-transitory computer-readable medium described herein, the spatial separation indication for the selected second UE indicates that a degree of spatial separation associated with the selected second UE exceeds a threshold amount, and the first UE forwards the first data to the selected second UE based on the degree of spatial separation exceeding the threshold amount.

In some examples of the method, first user equipment (UEs), and non-transitory computer-readable medium described herein, the spatial separation indication for the selected second UE indicates a degree of spatial separation associated with the selected second UE and the method, apparatuses, and non-transitory computer-readable medium may include further operations, features, means, or instructions for determining that the degree of spatial separation exceeds a threshold amount, where the first UE forwards the first data to the selected second UE based on determining that the degree of spatial separation exceeds the threshold amount.

In some examples of the method, first user equipment (UEs), and non-transitory computer-readable medium described herein, a percentage or an amount of data forwarded to the selected second UE may be based on the degree of spatial separation.

In some examples of the method, first user equipment (UEs), and non-transitory computer-readable medium described herein, the spatial separation indication may be provided via radio resource control signaling, medium access control (MAC) control element signaling, or downlink control information signaling.

A method for wireless communications by a network entity is described. The method may include transmitting, to a first UE, a spatial separation indication that indicates, for each of one or more second UEs, a spatial separation between the first UE and each respective second UE, receiving, from the first UE, an uplink UE aggregation request based on transmitting the spatial separation indication, and receiving a first shared channel transmission including first data, an aggregation flag, and a sequence number from the first UE and a second shared channel transmission including second data, the aggregation flag, and the sequence number from a second UE of the one or more second UEs based on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources.

A network entity for wireless communications is described. The network entity may include one or more memories storing processor executable code, and one or more processors coupled with the one or more memories. The one or more processors may individually or collectively operable to execute the code to cause the network entity to transmit, to a first UE, a spatial separation indication that indicates, for each of one or more second UEs, a spatial separation between the first UE and each respective second UE, receive, from the first UE, an uplink UE aggregation request based on transmitting the spatial separation indication, and receive a first shared channel transmission including first data, an aggregation flag, and a sequence number from the first UE and a second shared channel transmission including second data, the aggregation flag, and the sequence number from a second UE of the one or more second UEs based on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources.

Another network entity for wireless communications is described. The network entity may include means for transmitting, to a first UE, a spatial separation indication that indicates, for each of one or more second UEs, a spatial separation between the first UE and each respective second UE, means for receiving, from the first UE, an uplink UE aggregation request based on transmitting the spatial separation indication, and means for receiving a first shared channel transmission including first data, an aggregation flag, and a sequence number from the first UE and a second shared channel transmission including second data, the aggregation flag, and the sequence number from a second UE of the one or more second UEs based on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources.

A non-transitory computer-readable medium storing code for wireless communications is described. The code may include instructions executable by one or more processors to transmit, to a first UE, a spatial separation indication that indicates, for each of one or more second UEs, a spatial separation between the first UE and each respective second UE, receive, from the first UE, an uplink UE aggregation request based on transmitting the spatial separation indication, and receive a first shared channel transmission including first data, an aggregation flag, and a sequence number from the first UE and a second shared channel transmission including second data, the aggregation flag, and the sequence number from a second UE of the one or more second UEs based on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources.

Some examples of the method, network entities, and non-transitory computer-readable medium described herein may further include operations, features, means, or instructions for receiving, from the first UE, an indication that a quantity of data in an uplink buffer of the first UE satisfies a threshold quantity, where transmitting the spatial separation indication may be based on receiving the indication that the quantity of data in the uplink buffer of the first UE satisfies the threshold quantity.

In some examples of the method, network entities, and non-transitory computer-readable medium described herein, the quantity of data in the uplink buffer satisfying the threshold quantity includes the quantity of data in the uplink buffer exceeding the threshold quantity.

Some examples of the method, network entities, and non-transitory computer-readable medium described herein may further include operations, features, means, or instructions for transmitting an aggregation configuration to the first UE based on receiving the uplink UE aggregation request, where receiving the first shared channel transmission from the first UE and the second shared channel transmission from the second UE may be based on transmitting the aggregation configuration to the first UE.

In some examples of the method, network entities, and non-transitory computer-readable medium described herein, the second shared channel transmission includes an identifier of the first UE and the method, apparatuses, and non-transitory computer-readable medium may include further operations, features, means, or instructions for combining the first data of the first shared channel transmission and the second data of the second shared channel transmission based on the identifier of the first UE and the aggregation flag.

In some examples of the method, network entities, and non-transitory computer-readable medium described herein, the spatial separation indication for the second UE indicates that a degree of spatial separation associated with the second UE exceeds a threshold amount, and receiving the first shared channel transmission from the first UE and the second shared channel transmission from the second UE may be based on the degree of spatial separation exceeding the threshold amount.

In some examples of the method, network entities, and non-transitory computer-readable medium described herein, the spatial separation indication for the second UE of the one or more second UEs indicates a degree of spatial separation associated with the second UE, and receiving the first shared channel transmission from the first UE and the second shared channel transmission from the second UE may be based on the spatial separation indication indicating the degree of spatial separation associated with the second UE of the one or more second UEs.

In some examples of the method, network entities, and non-transitory computer-readable medium described herein, the spatial separation indication may be provided via radio resource control signaling, medium access control (MAC) control element signaling, or downlink control information signaling.

DETAILED DESCRIPTION

Figure 1:
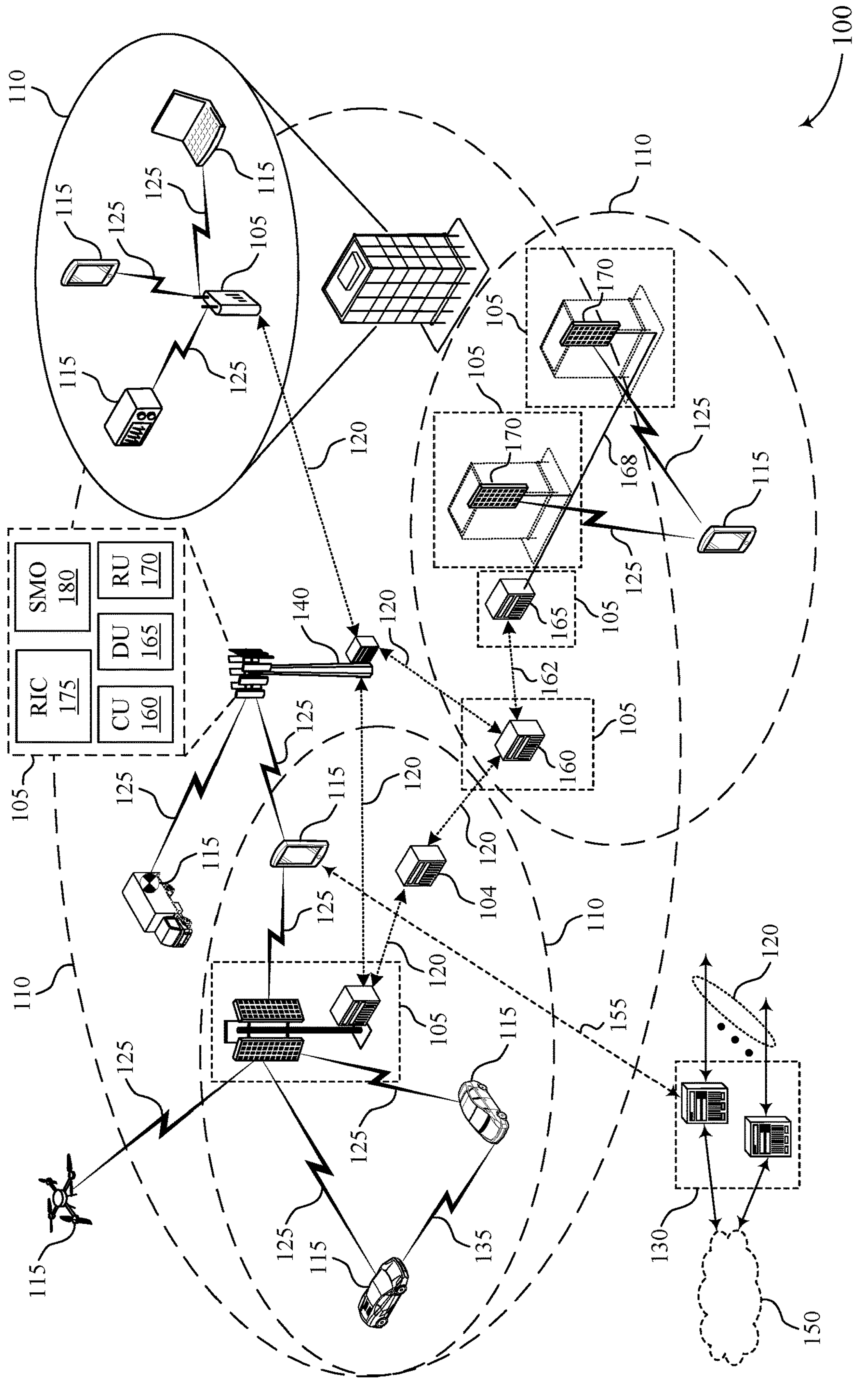
FIG. 1 shows an example of a wireless communications system that supports enhancement of user equipment (UE) selection for uplink aggregation in accordance with one or more aspects of the present disclosure.

Various aspects relate generally to wireless communication and more particularly to uplink carrier aggregation. Some aspects more specifically relate to providing a spatial separation indication that supports reduced latency for selecting UEs with which to perform uplink carrier aggregation. In some wireless communication systems, multiple user equipment (UE) may perform uplink carrier aggregation. For instance, a first UE may have first data that it forwards to a second UE. After forwarding the first data, the second UE may transmit the first data to a network entity while the first UE transmits second data (e.g., additional data) to the network entity. The network entity, upon receiving the first data and the second data, may combine the first data and second data. If a degree of spatial separation between the first UE and the second UE is below a threshold amount, the network entity may have a decreased likelihood of successfully decoding and combining the first data and the second data. Thus, in order to mitigate this decreased likelihood, the first UE may select a second UE that has the degree of spatial separation above the threshold amount. Techniques that decrease an amount of time utilized for the first UE to perform this selection process may decrease a latency associated with performing carrier aggregation and may thus increase the efficiency of wireless communications.

One technique to decrease the amount of time utilized for the first UE to select the second UE may be for the network entity to provide a spatial separation indication to the first UE. The spatial separation indication may indicate one or more UEs that have a degree of spatial separation with the first UE above the threshold amount from which the first UE may select the second UE. Alternatively, the spatial separation indication may indicate degrees of spatial separation for a set of UEs near the first UE (e.g., including the second UE), where the first UE may select a UE that has a degree of spatial separation above the threshold amount.

After receiving the spatial separation indication and selecting the second UE, the first UE may establish communications with the second UE and may forward the first data to the second UE. After forwarding the first data, the first UE may transmit a first shared channel transmission with the second data and an aggregation flag and the second UE may transmit a second shared channel transmission with the first data and the aggregation flag. The second shared channel transmission may also include an identifier of the first UE. When the network entity receives the first shared channel transmission and the second shared channel transmission, the network entity may combine the first and second data and may forward the combined data to the server.

In some examples, the first UE may determine that an uplink buffer of the first UE has data above a threshold amount and may perform uplink aggregation based on that determination. For instance, the first UE may signal to the network entity that it has an amount of data in its uplink buffer above a threshold amount and the network entity may signal the spatial separation indication in response. Alternatively, the network entity may send the spatial separation indication independent of the buffer status of the first UE (e.g., by sending the spatial separation indication periodically or semi-periodically) and the first UE may initiate uplink aggregation if it determines its uplink buffer has an amount of data above the threshold.

Particular aspects of the subject matter described in this disclosure can be implemented to realize one or more of the following potential advantages. For instance, by receiving a spatial separation indication, the first UE may be capable of determining a UE with sufficient separation (e.g., the second UE) more quickly on average than other techniques (e.g., examples in which the first UE attempts to determine degrees of spatial separation with nearby UEs without the network entity providing the spatial separation indication). Accordingly, uplink carrier aggregation may occur with reduced latency. Additionally, the techniques herein may enable increased throughput from the first UE by enabling the first UE to forward data to other UEs and then perform uplink carrier aggregation with the other UEs.

Aspects of the disclosure are initially described in the context of wireless communications systems. Additional aspects of the disclosure are described in the context of an uplink aggregation scheme and a process flow. Aspects of the disclosure are further illustrated by and described with reference to apparatus diagrams, system diagrams, and flowcharts that relate to enhancement of UE selection for uplink aggregation.

FIG. 1 shows an example of a wireless communications system 100 that supports enhancement of UE selection for uplink aggregation in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled)

by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support enhancement of UE selection for uplink aggregation as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some wireless communication systems, multiple UEs 115 may perform uplink carrier aggregation. For instance, a first UE 115 may have first data that it forwards to a second UE 115. After forwarding the first data, the second UE 115 may transmit the first data to a network entity while the first UE 115 transmits second data (e.g., additional data) to the network entity. The network entity, upon receiving the first data and the second data, may combine the first data and second data. If a degree of spatial separation between the first UE 115 and the second UE 115 is below a threshold amount, the network entity may have a decreased likelihood of successfully decoding and combining the first data and the second data. Thus, in order to mitigate this decreased likelihood, the first UE 115 may select a second UE 115 that has the degree of spatial separation above the threshold amount. Techniques that decrease an amount of time utilized for the first UE 115 to perform this selection process may decrease a latency associated with performing carrier aggregation and may thus increase the efficiency of wireless communications.

One technique to decrease the amount of time utilized for the first UE 115 to select the second UE 115 may be for the network entity to provide a spatial separation indication to the first UE 115. The spatial separation indication may indicate one or more UEs 115 that have a degree of spatial separation with the first UE 115 above the threshold amount from which the first UE 115 may select the second UE 115. Alternatively, the spatial separation indication may indicate degrees of spatial separation for a set of UEs 115 near the first UE 115 (e.g., including the second UE 115), where the first UE 115 may select a UE 115 that has a degree of spatial separation above the threshold amount.

After receiving the spatial separation indication and selecting the second UE 115, the first UE 115 may establish communications with the second UE 115 and may forward the first data to the second UE 115. After forwarding the first data, the first UE 115 may transmit a first shared channel transmission with the second data and an aggregation flag and the second UE 115 may transmit a second shared channel transmission with the first data and the aggregation flag. The second shared channel transmission may also include an identifier of the first UE 115. When the network entity receives the first shared channel transmission and the second shared channel transmission, the network entity may combine the first and second data and may forward the combined data to the server.

In some examples, the first UE 115 may determine that an uplink buffer of the first UE 115 has data above a threshold amount and may perform uplink aggregation based on that determination. For instance, the first UE 115 may signal to the network entity that it has too much data in its uplink buffer and the network entity may signal the spatial separation indication in response. Alternatively, the network entity may send the spatial separation indication independent of the buffer status of the first UE 115 (e.g., by sending the spatial separation indication periodically or semi-periodically) and the first UE 115 may initiate uplink aggregation if it determines its uplink buffer is large enough.

Figure 2:
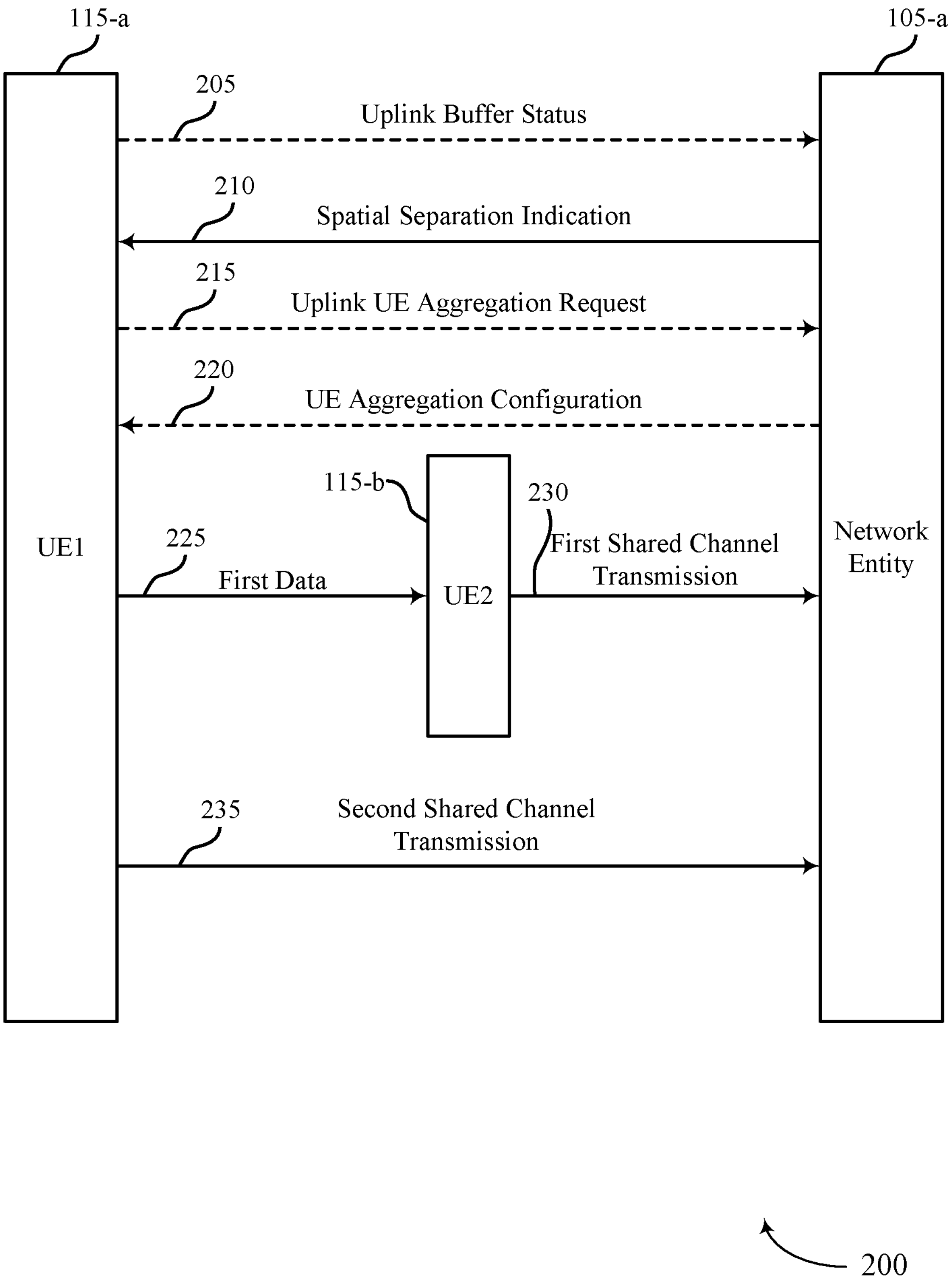
FIG. 2 shows an example of a wireless communications scheme that supports enhancement of UE selection for uplink aggregation in accordance with one or more aspects of the present disclosure.

FIG. 2 shows an example of a wireless communications system 200 that supports enhancement of UE selection for uplink aggregation in accordance with one or more aspects of the present disclosure. In some examples, wireless communications system 200 may implement one or more aspects of wireless communications system 100. For instance, UEs 115-*a* and 115-*b* may each be an example of a UE 115 as described with reference to FIG. 1 and/or network entity 105-*a* may be an example of a network entity as described with reference to FIG. 2.

In some examples, wireless communication system 200 may perform an uplink MU-MIMO based uplink UE aggregation. For instance, UE 115-*a* may transmit, to network entity 105-*a*, a status 205 of an uplink buffer of UE 115-*a* (e.g., an indication of whether a quantity of data within the buffer satisfies a threshold). In response to receiving the status 205, network entity 105-*a* may transmit a spatial separation indication 210 to UE 115-*a*. The spatial separation indication 210 may indicate a degree of spatial separation between UE 115-*a* and each one of a set of UEs (e.g., the set of UEs including UE 115-*b*) or may indicate one or more UEs which each have a respective degree of spatial separation with UE 115-*a* higher than a threshold amount. In some examples, network entity 105-*a* may determine the degree of separation for each of the set of UEs and/or the one or more UEs using uplink MU-MIMO techniques.

After receiving the spatial separation indication 210, UE 115-*a* may select UE 115-*b* (e.g., due to UE 115-*b* having a degree of spatial separation above the threshold amount) and may transmit an uplink UE aggregation request 215 to network entity 105-*a*. In response to the uplink UE aggregation request 215, network entity 105-*a* may transmit a UE aggregation configuration 220 (e.g., a configuration that enables uplink UE aggregation) to UE 115-*a*. Additionally, after receiving the spatial separation indication 210, UE 115-*a* may forward first data 225 to UE 115-*b*. UE 115-*b* may transmit a first shared channel transmission 230 (e.g., a physical uplink shared channel (PUSCH) transmission) that includes the first data 225 and UE 115-*b* may transmit a second shared channel transmission 235 (e.g., a PUSCH transmission) that includes second data (e.g., additional data). Network entity 105-*a* may combine the first data 225 and the second data to generate a message and may forward the message to a server.

The techniques of this application may be associated with one or more advantages. For instance, having network entity 105-*a* provide the spatial separation indication may enable UE 115-*a* to determine a nearby UE with sufficient spatial separation (e.g., UE 115-*b*) more quickly on average than if UE 115-*a* attempts to determine degrees of spatial separation with nearby UEs. Accordingly, uplink carrier aggregation may occur with reduced latency when the techniques of the application are employed. Additionally, the techniques described herein may enable a throughput of UE 115-*a* to increase by n, where n may represent a total number of UEs to which UE 115-*a* performs uplink carrier aggregation with (e.g., n=2 in the case where only UE 115-*a* and UE 115-*b* are used).

Figure 3:
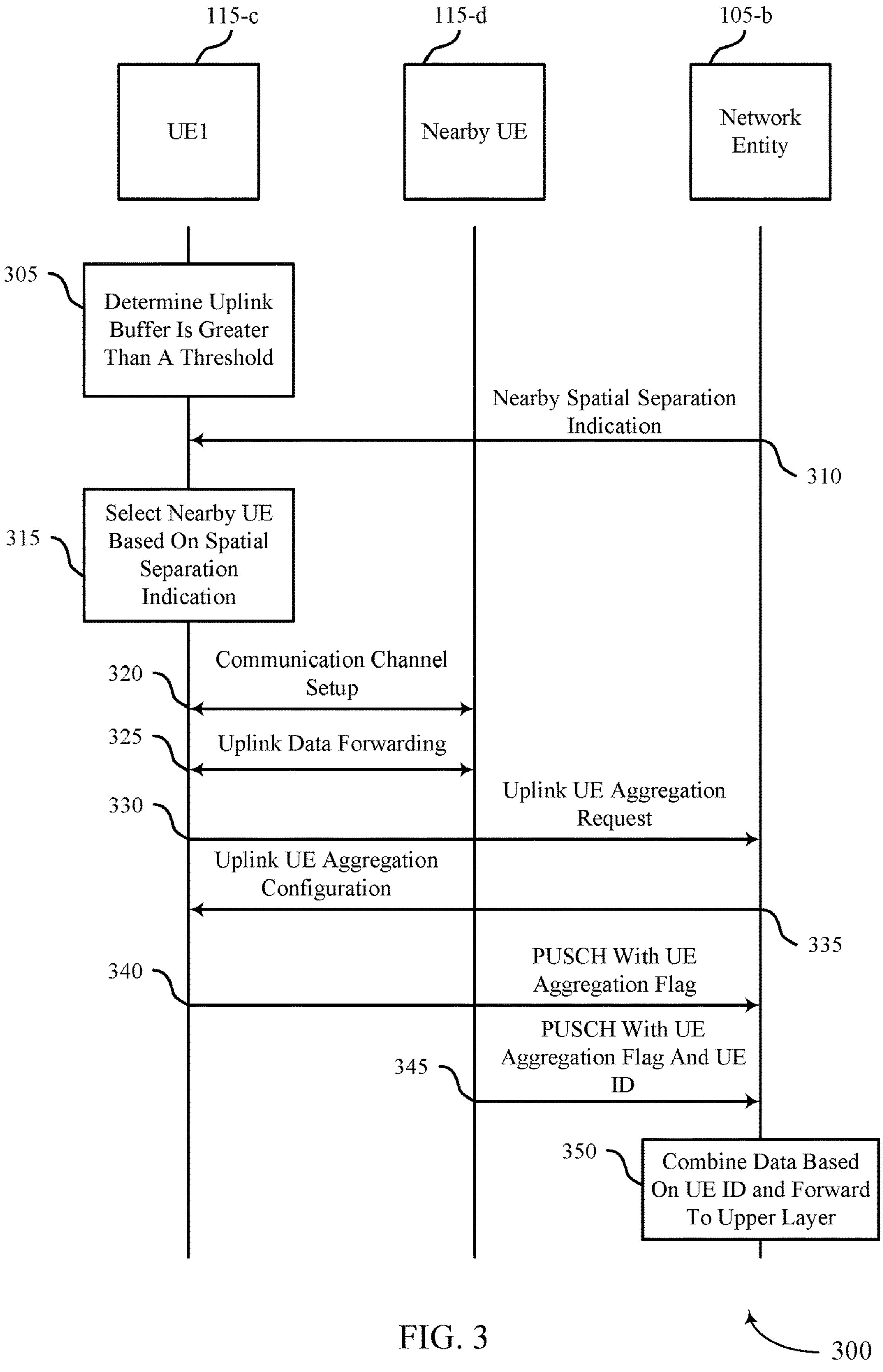
FIG. 3 shows an example of an uplink aggregation scheme that supports enhancement of UE selection for uplink aggregation in accordance with one or more aspects of the present disclosure.

FIG. 3 shows an example of an uplink aggregation scheme 300 that supports enhancement of UE selection for uplink aggregation in accordance with one or more aspects of the present disclosure. In some examples, uplink aggregation scheme 300 may be implemented by one or more aspects of wireless communications system 100 and/or wireless communications system 200. For instance, UE 115-*c* may be an example of a UE 115 as described with reference to FIG. 1 and/or UE 115-*a* as described with reference to FIG. 2; UE 115-*d* may be an example of a UE 115 as described with reference to FIG. 1 and/or UE 115-*b* as described with reference to FIG. 2; network entity 105-*b* may be an example of a network entity 105 as described with reference to FIG. 1 and/or network entity 105-*a* as described with reference to FIG. 2; or a combination thereof.

At 305, UE 115-*c* may determine that an uplink buffer of UE 115-*c* has an amount of data greater than a threshold quantity. In some examples, UE 115-*c* may indicate that the amount of data is greater than the threshold quantity for the uplink buffer to network entity 105-*b* (e.g., via a buffer status report (BSR)).

At 310, network entity 105-*b* may transmit a nearby spatial separation indication to UE 115-*c*. In some examples, network entity 105-*b* may provide the nearby spatial separation indication to indicate UEs nearby to UE 115-*c* with a spatial separation above a threshold degree based on determining that UE 115-*c* has an uplink buffer with an amount of data greater than the threshold quantity (e.g., via an indication provided by UE 115-*c*).

At 315, UE 115-*c* may select one or more nearby UEs (e.g., UE 115-*d*) based on the spatial separation indication. For instance, UE 115-*c* may select one or more UEs that each have a degree of spatial separation with UE 115-*c* above the threshold degree.

At 320, UE 115-*c* may perform a communication channel setup with the one or more selected UEs (e.g., set up sidelink communication or another communication channel with one or more indicated nearby UEs, such as UE 115-*d*). At 325, UE 115-*c* may forward its data to the one or more selected UEs. For instance, UE 115-*c* may forward first data to UE 115-*d*. A percentage or amount of data that UE 115-*c* forwards to the one or more selected UEs may depend on or otherwise be based on a degree of spatial separation that UE 115-*c* has with each of the one or more selected UEs.

At 330, UE 115-*c* may transmit an uplink UE aggregation request (e.g., via MAC-CE signaling or RRC signaling) to network entity 105-*b*. After receiving the uplink UE aggregation request, network entity 105-*b* may transmit an uplink UE aggregation configuration 335 (e.g., a configuration enabling uplink UE aggregation) to UE 115-*c*.

At 340, UE 115-*c* may transmit a first PUSCH with a UE aggregation flag. At 345, each of the one or more selected UEs may transmit a respective PUSCH with the UE aggregation flag and a UE ID (e.g., an ID of UE 115-*c*). For instance, UE 115-*d* may transmit a second PUSCH with UE aggregation flag and a UE ID (e.g., an ID of UE 115-*c*).

At 350, network entity 105-*b* may combine the data received from UE 115-*c* and the one or more selected UEs (e.g., on a MAC level) and may send or forward the combined uplink data to a server. For instance, network entity 105-*b* may combine the data indicated by the first PUSCH at 340 with the data indicated by the second PUSCH at 345.

Figure 4:
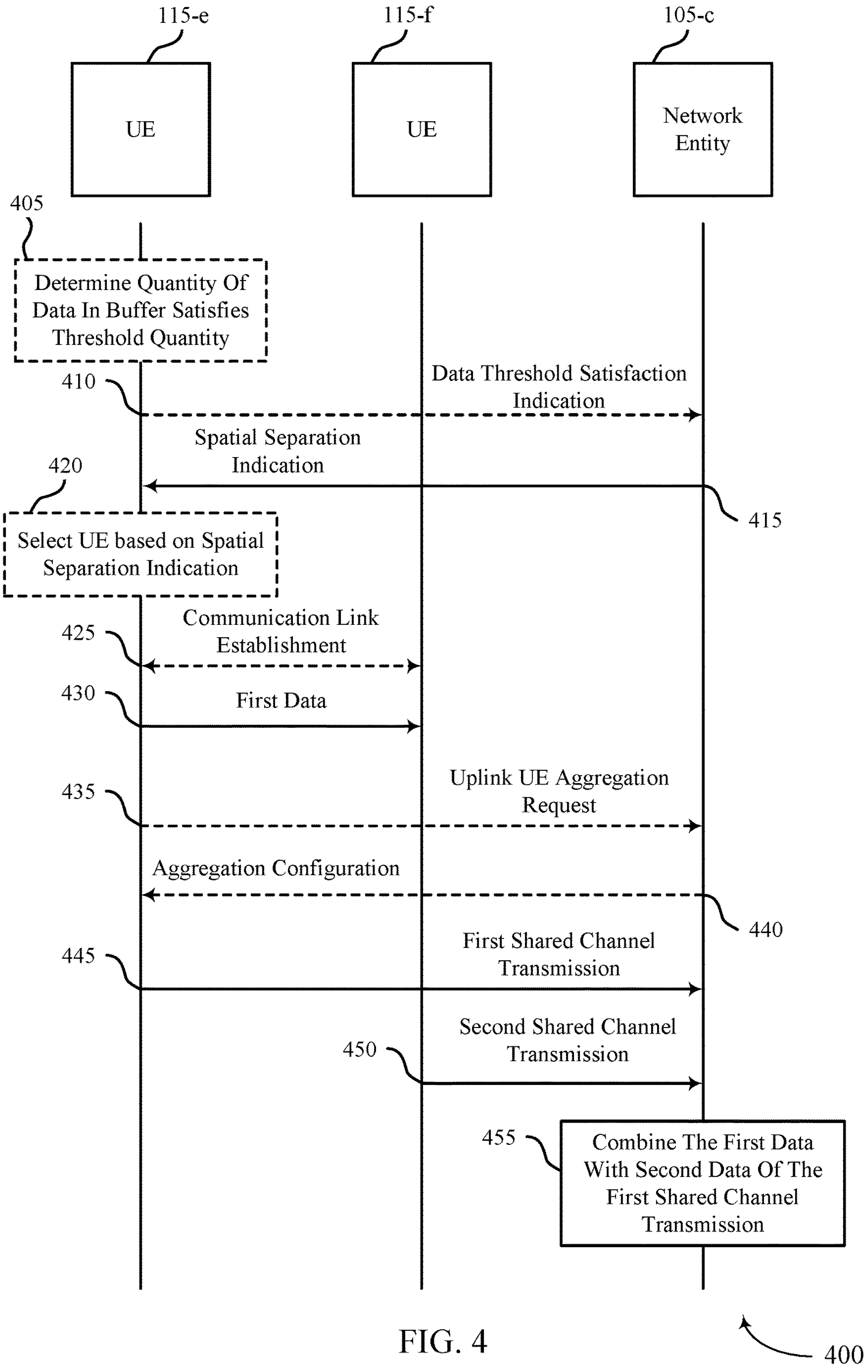
FIG. 4 shows an example of a process flow that supports enhancement of UE selection for uplink aggregation in accordance with one or more aspects of the present disclosure.

FIG. 4 shows an example of a process flow 400 that supports enhancement of UE selection for uplink aggregation in accordance with one or more aspects of the present disclosure. In some examples, process flow 400 may be implemented by one or more aspects of wireless communications system 100, wireless communications system 200, and/or uplink aggregation scheme 300. For instance, UE 115-*e* may be an example of a UE 115 as described with reference to FIG. 1, UE 115-*a* as described with reference to FIG. 2, and/or UE 115-*c* as described with reference to FIG. 3; UE 115-*f* may be an example of a UE 115 as described with reference to FIG. 1, UE 115-*b* as described with reference to FIG. 2, and/or UE 115-*d* as described with reference to FIG. 3; network entity 105-*c* may be an example of a network entity 105 as described with reference to FIG.

1, network entity 105-*a* as described with reference to FIG. 2, and/or network entity 105-*b* as described with reference to FIG. 3.

At 405, UE 115-*e* may determine that a quantity of data in an uplink buffer of UE 115-*e* satisfies a threshold quantity.

At 410, UE 115-*e* may transmit, to network entity 105-*c*, an indication that the quantity of data in the uplink buffer of UE 115-*e* satisfies the threshold quantity. The quantity of data in the uplink buffer satisfying the threshold quantity may include the quantity of data in the uplink buffer exceeding the threshold quantity.

At 415, UE 115-*e* may receive, from network entity 105-*c*, a spatial separation indication that indicates, for each of one or more UEs (e.g., UE 115-*f*), a spatial separation between UE 115-*e* and each respective UE of the one or more UEs. Receiving the spatial separation indication may be based on UE 115-*e* transmitting the indication that the quantity of data in the uplink buffer of UE 115-*e* satisfies the threshold quantity. The spatial separation indication may be provided via RRC signaling, MAC-CE signaling, or DCI signaling.

At 420, UE 115-*e* may select UE 115-*f* from the one or more UEs based on the spatial separation indication. The spatial separation indication may indicate that a degree of spatial separation associated with UE 115-*e* may exceed a threshold amount or may indicate the degree of spatial separation associated with UE 115-*f* (e.g., the degree of spatial separation between UE 115-*e* and UE 115-*f*).

At 425, UE 115-*e* may establish a communication link with UE 115-*f* based on selecting UE 115-*e*.

At 430, UE 115-*e* may forward first data to UE 115-*f* (e.g., the selected UE of the one or more UEs). The first data may be forwarded as part of an uplink UE aggregation procedure that is based on the spatial separation indication. Forwarding the first data may be based on determining that the quantity of data in the uplink buffer satisfies the threshold quantity. In some examples, UE 115-*e* may forward the first data abased on the degree of spatial separation associated with UE 115-*f* exceeding the threshold amount. Additionally, or alternatively, UE 115-*e* may determine that the degree of spatial separation indicated in the spatial separation indication exceeds the threshold amount. In some examples, a percentage or amount of data forwarded to UE 115-*f* may be based on the degree of spatial separation (e.g., more data may be included in the first data forwarded to UE 115-*f* as the degree of spatial separation increases).

At 435, UE 115-*e* may transmit, to network entity 105-*c*, an uplink UE aggregation request based on the spatial separation indication.

At 440, network entity 105-*c* may transmit an aggregation configuration based on transmitting the spatial separation indication and/or based on receiving the uplink UE aggregation request.

At 445, UE 115-*e* may transmit, to network entity 105-*c* and as part of the uplink UE aggregation procedure, a first shared channel transmission in a radio resource that includes second data, an aggregation flag, and a sequence number. The aggregation flag and/or the sequence number may be indicative that the second data is to be aggregated with the first data (e.g., the first data forwarded at 430) in a sequence order. Transmitting the first shared channel transmission may be based on transmitting the uplink UE aggregation request and/or receiving the aggregation configuration.

At 450, UE 115-*f* may transmit a second shared channel transmission including the first data, the aggregation flag, and the sequence number. In some examples, the first shared channel transmission and the second shared channel transmission are received in overlapping or non-overlapping radio resources.

At 455, network entity 105-*c* may combine the second data of the first shared channel transmission and the first data of the second shared channel transmission.

Figure 5:
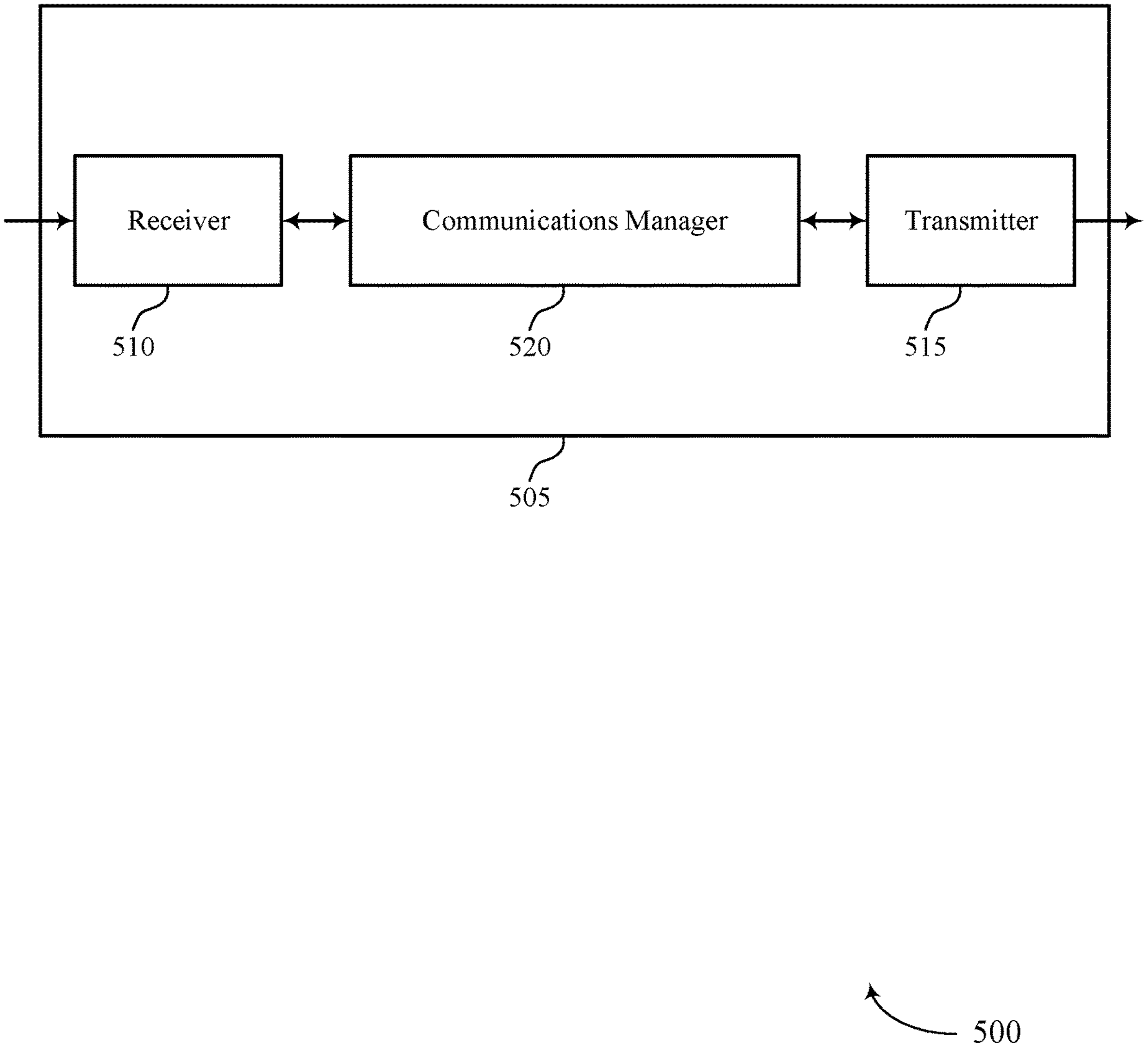
FIGS. 5 and 6 show block diagrams of devices that support enhancement of UE selection for uplink aggregation in accordance with one or more aspects of the present disclosure.

FIG. 5 shows a block diagram 500 of a device 505 that supports enhancement of UE selection for uplink aggregation in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to enhancement of UE selection for uplink aggregation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhancement of UE selection for uplink aggregation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of enhancement of UE selection for uplink aggregation as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communications in accordance with examples as disclosed herein. For example, the communications manager 520 is capable of, configured to, or operable to support a means for receiving, from a network entity, a spatial separation indication that indicates, for each of one or more second UEs, a spatial separation between the first UE and each respective second UE. The communications manager 520 is capable of, configured to, or operable to support a means for forwarding first data to a selected second UE of the one or more second UEs, where the first data is forwarded as part of an uplink UE aggregation procedure that is based on the spatial separation indication. The communications manager 520 is capable of, configured to, or operable to support a means for transmitting, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced latency when the device 505 is selecting a UE with which to perform uplink aggregation, where the selected UE has a spatial separation with the device 505 adequate for performing uplink aggregation.

Figure 6:
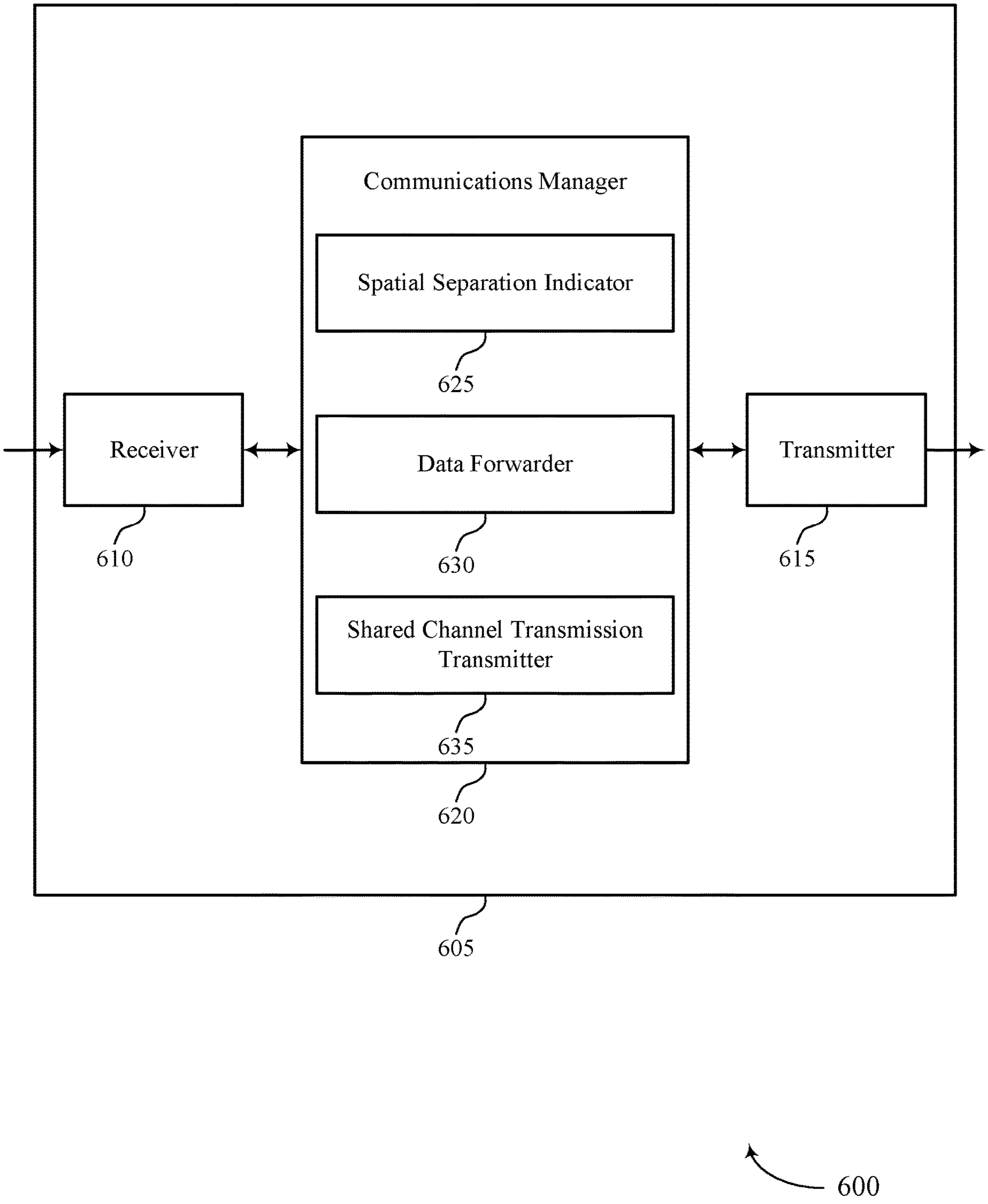

FIG. 6 shows a block diagram 600 of a device 605 that supports enhancement of UE selection for uplink aggregation in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to enhancement of UE selection for uplink aggregation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhancement of UE selection for uplink aggregation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhancement of UE selection for uplink aggregation as described herein. For example, the communications manager 620 may include a spatial separation indicator 625, a data forwarder 630, a shared channel transmission transmitter 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The spatial separation indicator 625 is capable of, configured to, or operable to support a means for receiving, from a network entity, a spatial separation indication that indicates, for each of one or more second UEs, a spatial separation between the first UE and each respective second UE. The data forwarder 630 is capable of, configured to, or operable to support a means for forwarding first data to a selected second UE of the one or more second UEs, where the first data is forwarded as part of an uplink UE aggregation procedure that is based on the spatial separation indication. The shared channel transmission transmitter 635 is capable of, configured to, or operable to support a means for transmitting, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order.

Figure 7:
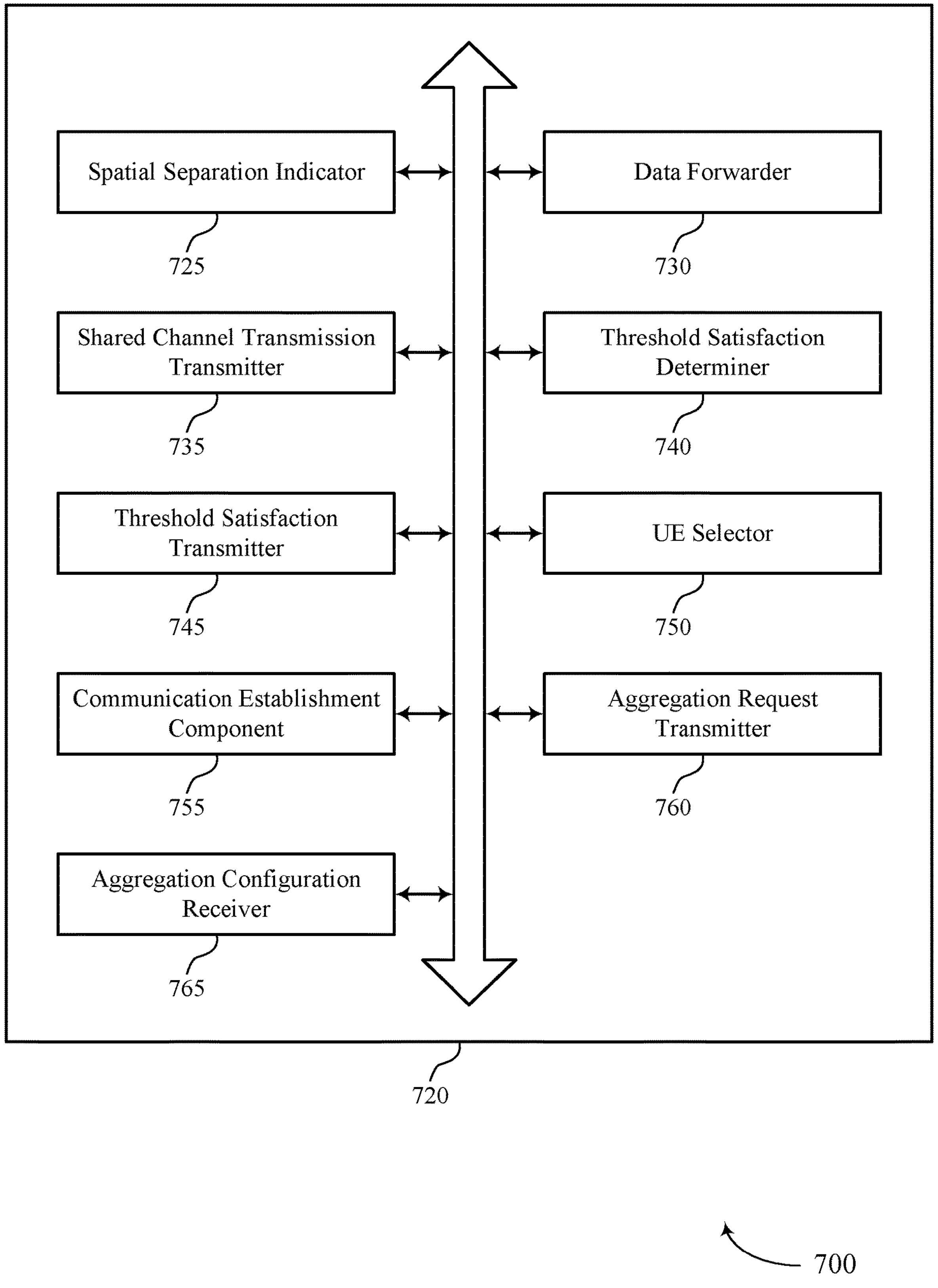
FIG. 7 shows a block diagram of a communications manager that supports enhancement of UE selection for uplink aggregation in accordance with one or more aspects of the present disclosure.

FIG. 7 shows a block diagram 700 of a communications manager 720 that supports enhancement of UE selection for uplink aggregation in accordance with one or more aspects of the present disclosure. The communications manager 720 may be an example of aspects of a communications manager 520, a communications manager 620, or both, as described herein. The communications manager 720, or various components thereof, may be an example of means for performing various aspects of enhancement of UE selection for uplink aggregation as described herein. For example, the communications manager 720 may include a spatial separation indicator 725, a data forwarder 730, a shared channel transmission transmitter 735, a threshold satisfaction determiner 740, a threshold satisfaction transmitter 745, a UE selector 750, a communication establishment component 755, an aggregation request transmitter 760, an aggregation configuration receiver 765, or any combination thereof. Each of these components, or components or subcomponents thereof (e.g., one or more processors, one or more memories), may communicate, directly or indirectly, with one another (e.g., via one or more buses).

Additionally, or alternatively, the communications manager 720 may support wireless communications in accordance with examples as disclosed herein. The spatial separation indicator 725 is capable of, configured to, or operable to support a means for receiving, from a network entity, a spatial separation indication that indicates, for each of one or more second UEs, a spatial separation between the first UE and each respective second UE. The data forwarder 730 is capable of, configured to, or operable to support a means for forwarding first data to a selected second UE of the one or more second UEs, where the first data is forwarded as part of an uplink UE aggregation procedure that is based on the spatial separation indication. The shared channel transmission transmitter 735 is capable of, configured to, or operable to support a means for transmitting, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order.

In some examples, the threshold satisfaction determiner 740 is capable of, configured to, or operable to support a means for determining that a quantity of data in an uplink buffer of the first UE satisfies a threshold quantity, where forwarding the first data is based on determining that the quantity of data in the uplink buffer satisfies the threshold quantity.

In some examples, the threshold satisfaction transmitter 745 is capable of, configured to, or operable to support a means for transmitting, to the network entity, an indication that a quantity of data in an uplink buffer of the first UE satisfies a threshold quantity, where receiving the spatial separation indication is based on transmitting the indication that the quantity of data in the uplink buffer of the first UE satisfies the threshold quantity.

In some examples, the quantity of data in the uplink buffer satisfying the threshold quantity includes the quantity of data in the uplink buffer exceeding the threshold quantity.

In some examples, the UE selector 750 is capable of, configured to, or operable to support a means for selecting the selected second UE from the one or more second UEs based on the spatial separation indication. In some examples, the communication establishment component 755 is capable of, configured to, or operable to support a means for establishing a communication link with the selected second UE based on selecting the selected second UE.

In some examples, the aggregation request transmitter 760 is capable of, configured to, or operable to support a means for transmitting, to the network entity, an uplink UE aggregation request based on the spatial separation indication, where transmitting the shared channel transmission is based on transmitting the uplink UE aggregation request.

In some examples, the aggregation configuration receiver 765 is capable of, configured to, or operable to support a means for receiving an aggregation configuration from the network entity based on transmitting the uplink UE aggregation request, where transmitting the shared channel transmission is based on receiving the aggregation configuration.

In some examples, the spatial separation indication for the selected second UE indicates that a degree of spatial separation associated with the selected second UE exceeds a threshold amount, and the first UE forwards the first data to the selected second UE based on the degree of spatial separation exceeding the threshold amount.

In some examples, the spatial separation indication for the selected second UE indicates a degree of spatial separation associated with the selected second UE, and the threshold satisfaction determiner 740 is capable of, configured to, or operable to support a means for determining that the degree of spatial separation exceeds a threshold amount, where the first UE forwards the first data to the selected second UE based on determining that the degree of spatial separation exceeds the threshold amount.

In some examples, a percentage or amount of data forwarded to the selected second UE is based on the degree of spatial separation.

In some examples, the spatial separation indication is provided via radio resource control signaling, medium access control (MAC) control element signaling, or downlink control information signaling.

Figure 8:
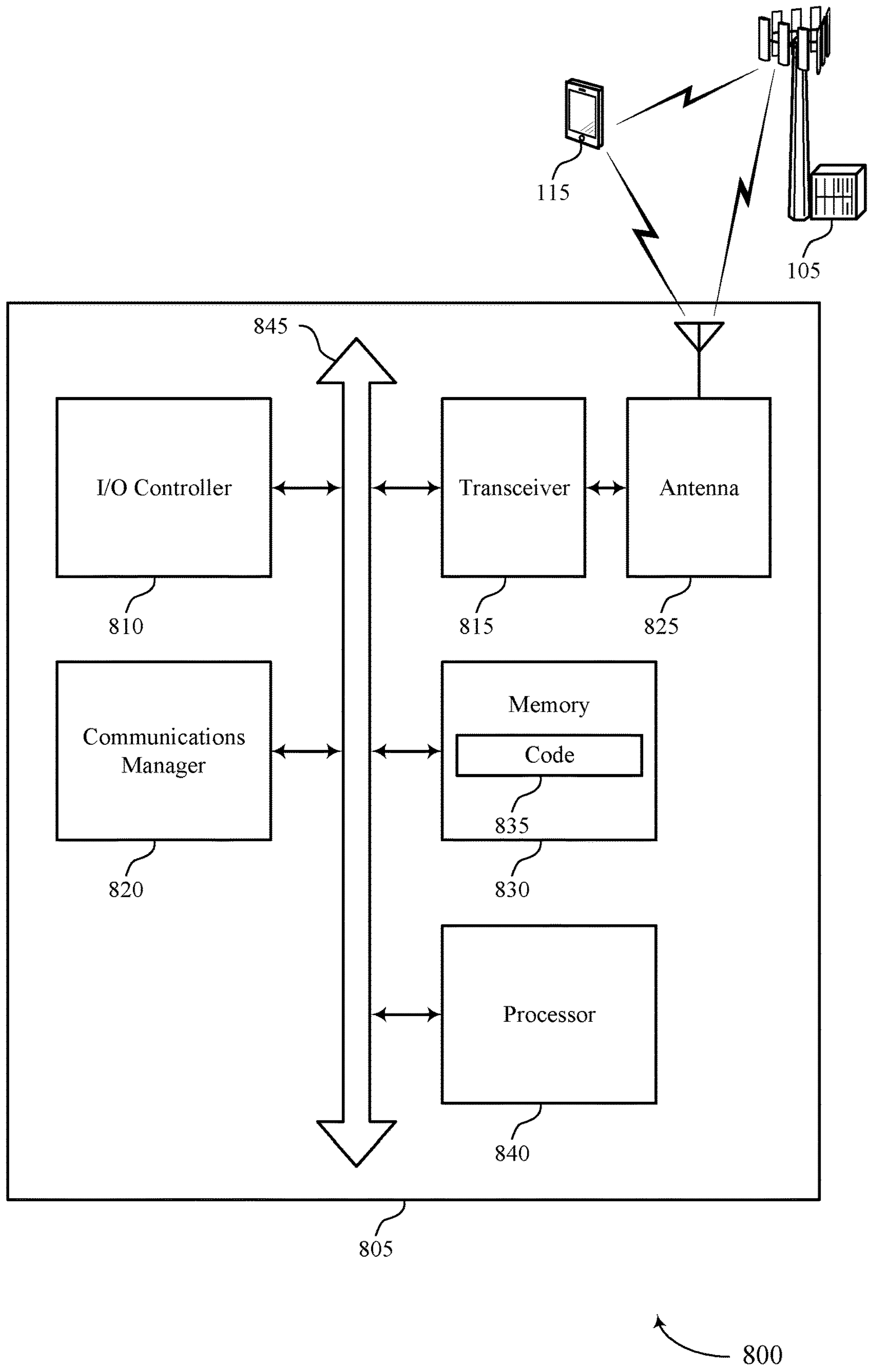
FIG. 8 shows a diagram of a system including a device that supports enhancement of UE selection for uplink aggregation in accordance with one or more aspects of the present disclosure.

FIG. 8 shows a diagram of a system 800 including a device 805 that supports enhancement of UE selection for uplink aggregation in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting enhancement of UE selection for uplink aggregation). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

Additionally, or alternatively, the communications manager 820 may support wireless communications in accordance with examples as disclosed herein. For example, the communications manager 820 is capable of, configured to, or operable to support a means for receiving, from a network entity, a spatial separation indication that indicates, for each of one or more second UEs, a spatial separation between the first UE and each respective second UE. The communications manager 820 is capable of, configured to, or operable to support a means for forwarding first data to a selected second UE of the one or more second UEs, where the first data is forwarded as part of an uplink UE aggregation procedure that is based on the spatial separation indication. The communications manager 820 is capable of, configured to, or operable to support a means for transmitting, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order.

By including or configuring the communications manager 820 in accordance with examples as described herein, the device 805 may support techniques for reduced latency when the device 805 is selecting a UE with which to perform uplink aggregation, where the selected UE has a spatial separation with the device 805 adequate for performing uplink aggregation.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of enhancement of UE selection for uplink aggregation as described herein, or the at least one processor 840 and the at least one memory 830 may be otherwise configured to, individually or collectively, perform or support such operations.

Figure 9:
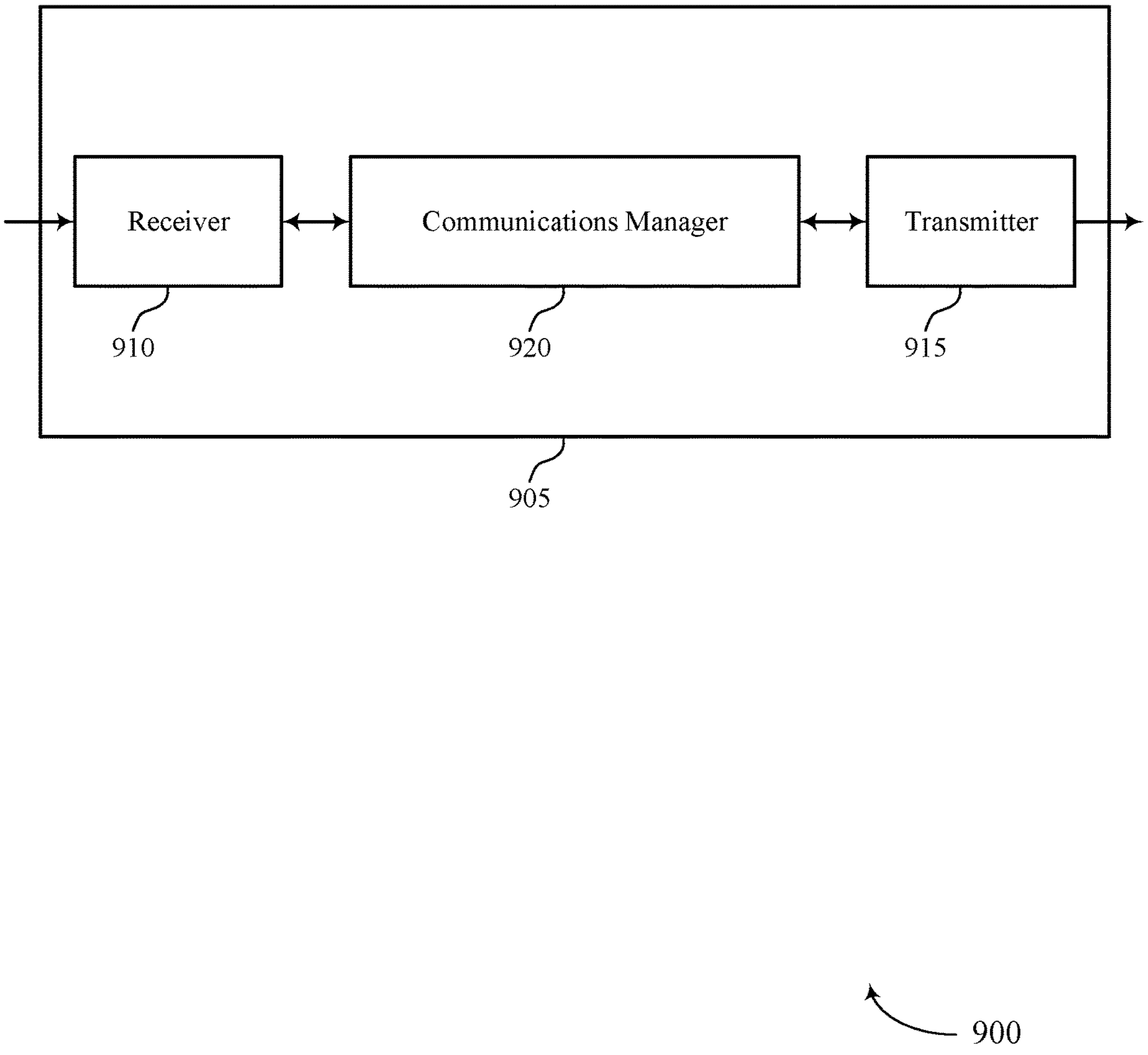
FIGS. 9 and 10 show block diagrams of devices that support enhancement of UE selection for uplink aggregation in accordance with one or more aspects of the present disclosure.

FIG. 9 shows a block diagram 900 of a device 905 that supports enhancement of UE selection for uplink aggregation in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of enhancement of UE selection for uplink aggregation as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

Additionally, or alternatively, the communications manager 920 may support wireless communications in accordance with examples as disclosed herein. For example, the communications manager 920 is capable of, configured to, or operable to support a means for transmitting, to a first UE, a spatial separation indication that indicates, for each of one or more second UEs, a spatial separation between the first UE and each respective second UE. The communications manager 920 is capable of, configured to, or operable to support a means for receiving, from the first UE, an uplink UE aggregation request based on transmitting the spatial separation indication. The communications manager 920 is capable of, configured to, or operable to support a means for receiving a first shared channel transmission including first data, an aggregation flag, and a sequence number from the first UE and a second shared channel transmission including second data, the aggregation flag, and the sequence number from a second UE of the one or more second UEs based at least in part on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for reduced latency when a set of UEs are to perform uplink aggregation with the device 905.

Figure 10:
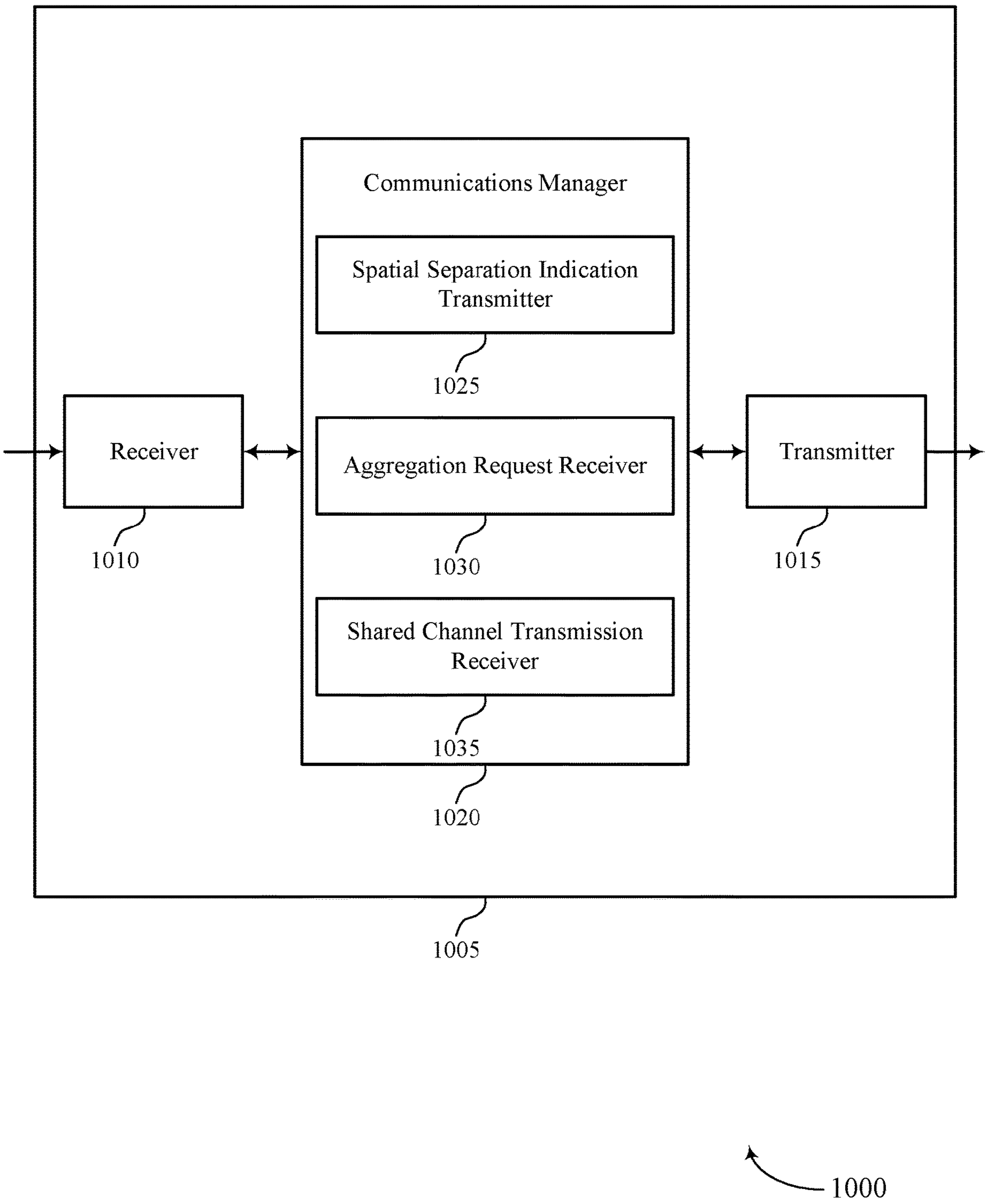

FIG. 10 shows a block diagram 1000 of a device 1005 that supports enhancement of UE selection for uplink aggregation in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of enhancement of UE selection for uplink aggregation as described herein. For example, the communications manager 1020 may include a spatial separation indication transmitter 1025, an aggregation request receiver 1030, a shared channel transmission receiver 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The spatial separation indication transmitter 1025 is capable of, configured to, or operable to support a means for transmitting, to a first UE, a spatial separation indication that indicates, for each of one or more second UEs, a spatial separation between the first UE and each respective second UE. The aggregation request receiver 1030 is capable of, configured to, or operable to support a means for receiving, from the first UE, an uplink UE aggregation request based on transmitting the spatial separation indication. The shared channel transmission receiver 1035 is capable of, configured to, or operable to support a means for receiving a first shared channel transmission including first data, an aggregation flag, and a sequence number from the first UE and a second shared channel transmission including second data, the aggregation flag, and the sequence number from a second UE of the one or more second UEs based at least in part on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources.

Figure 11:
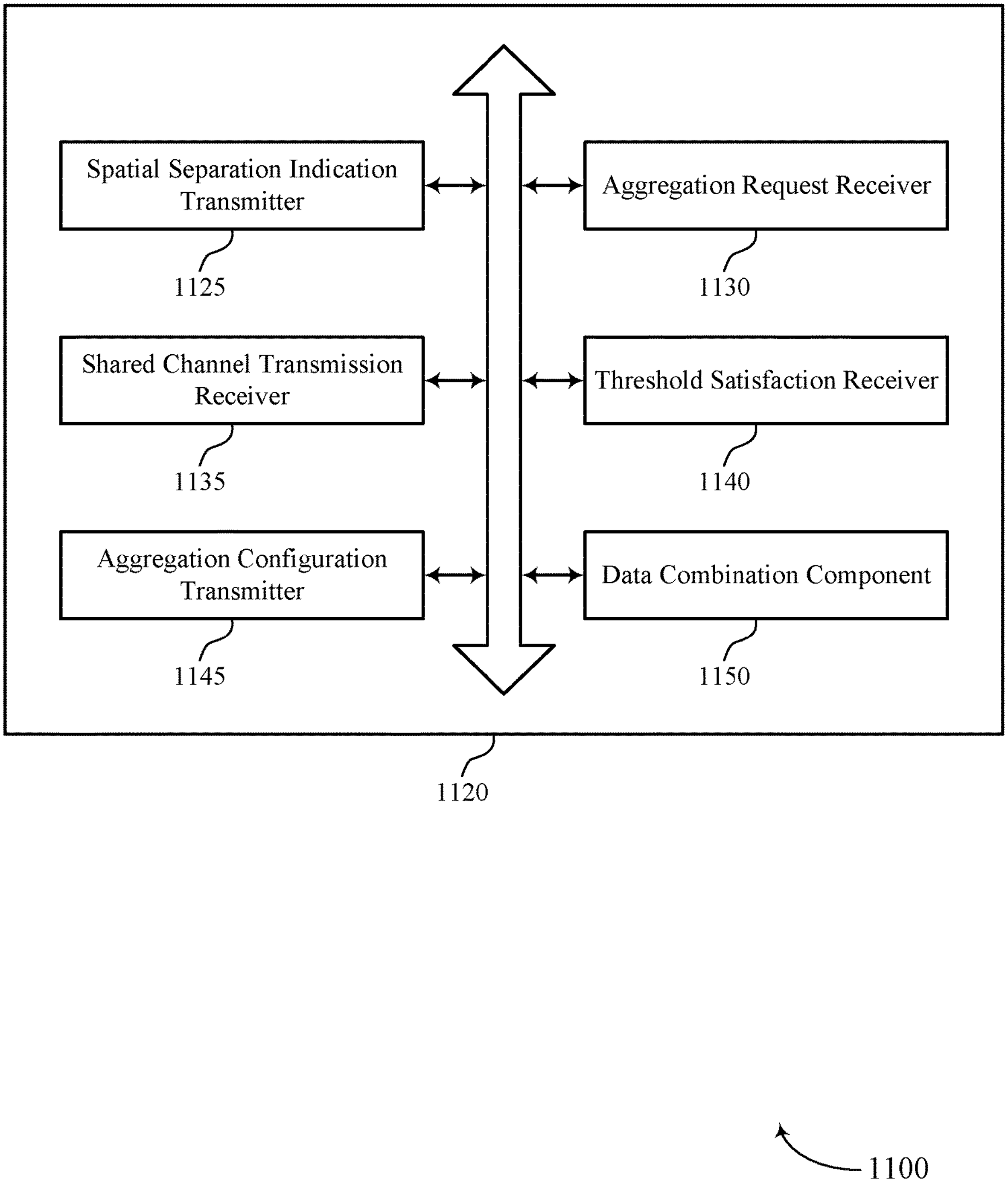
FIG. 11 shows a block diagram of a communications manager that supports enhancement of UE selection for uplink aggregation in accordance with one or more aspects of the present disclosure.

FIG. 11 shows a block diagram 1100 of a communications manager 1120 that supports enhancement of UE selection for uplink aggregation in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of enhancement of UE selection for uplink aggregation as described herein. For example, the communications manager 1120 may include a spatial separation indication transmitter 1125, an aggregation request receiver 1130, a shared channel transmission receiver 1135, a threshold satisfaction receiver 1140, an aggregation configuration transmitter 1145, a data combination component 1150, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

Additionally, or alternatively, the communications manager 1120 may support wireless communications in accordance with examples as disclosed herein. The spatial separation indication transmitter 1125 is capable of, configured to, or operable to support a means for transmitting, to a first UE, a spatial separation indication that indicates, for each of one or more second UEs, a spatial separation between the first UE and each respective second UE. The aggregation request receiver 1130 is capable of, configured to, or operable to support a means for receiving, from the first UE, an uplink UE aggregation request based on transmitting the spatial separation indication. The shared channel transmission receiver 1135 is capable of, configured to, or operable to support a means for receiving a first shared channel transmission including first data, an aggregation flag, and a sequence number from the first UE and a second shared channel transmission including second data, the aggregation flag, and the sequence number from a second UE of the one or more second UEs based at least in part on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources.

In some examples, the threshold satisfaction receiver 1140 is capable of, configured to, or operable to support a means for receiving, from the first UE, an indication that a quantity of data in an uplink buffer of the first UE satisfies a threshold quantity, where transmitting the spatial separation indication is based on receiving the indication that the quantity of data in the uplink buffer of the first UE satisfies the threshold quantity.

In some examples, the quantity of data in the uplink buffer satisfying the threshold quantity includes the quantity of data in the uplink buffer exceeding the threshold quantity.

In some examples, the aggregation configuration transmitter 1145 is capable of, configured to, or operable to support a means for transmitting an aggregation configuration to the first UE based on receiving the uplink UE aggregation request, where receiving the first shared channel transmission from the first UE and the second shared channel transmission from the second UE is based on transmitting the aggregation configuration to the first UE.

In some examples, the second shared channel transmission includes an identifier of the first UE, and the data combination component 1150 is capable of, configured to, or operable to support a means for combining the first data of the first shared channel transmission and the second data of the second shared channel transmission based on the identifier of the first UE and the aggregation flag.

In some examples, the spatial separation indication for the second UE indicates that a degree of spatial separation associated with the second UE exceeds a threshold amount, and receiving the first shared channel transmission from the first UE and the second shared channel transmission from the second UE is based on the degree of spatial separation exceeding the threshold amount.

In some examples, the spatial separation indication for the second UE of the one or more second UEs indicates a degree of spatial separation associated with the second UE, and receiving the first shared channel transmission from the first UE and the second shared channel transmission from the second UE is based on the spatial separation indication indicating the degree of spatial separation associated with the second UE of the one or more second UEs.

In some examples, the spatial separation indication is provided via radio resource control signaling, medium access control (MAC) control element signaling, or downlink control information signaling.

Figure 12:
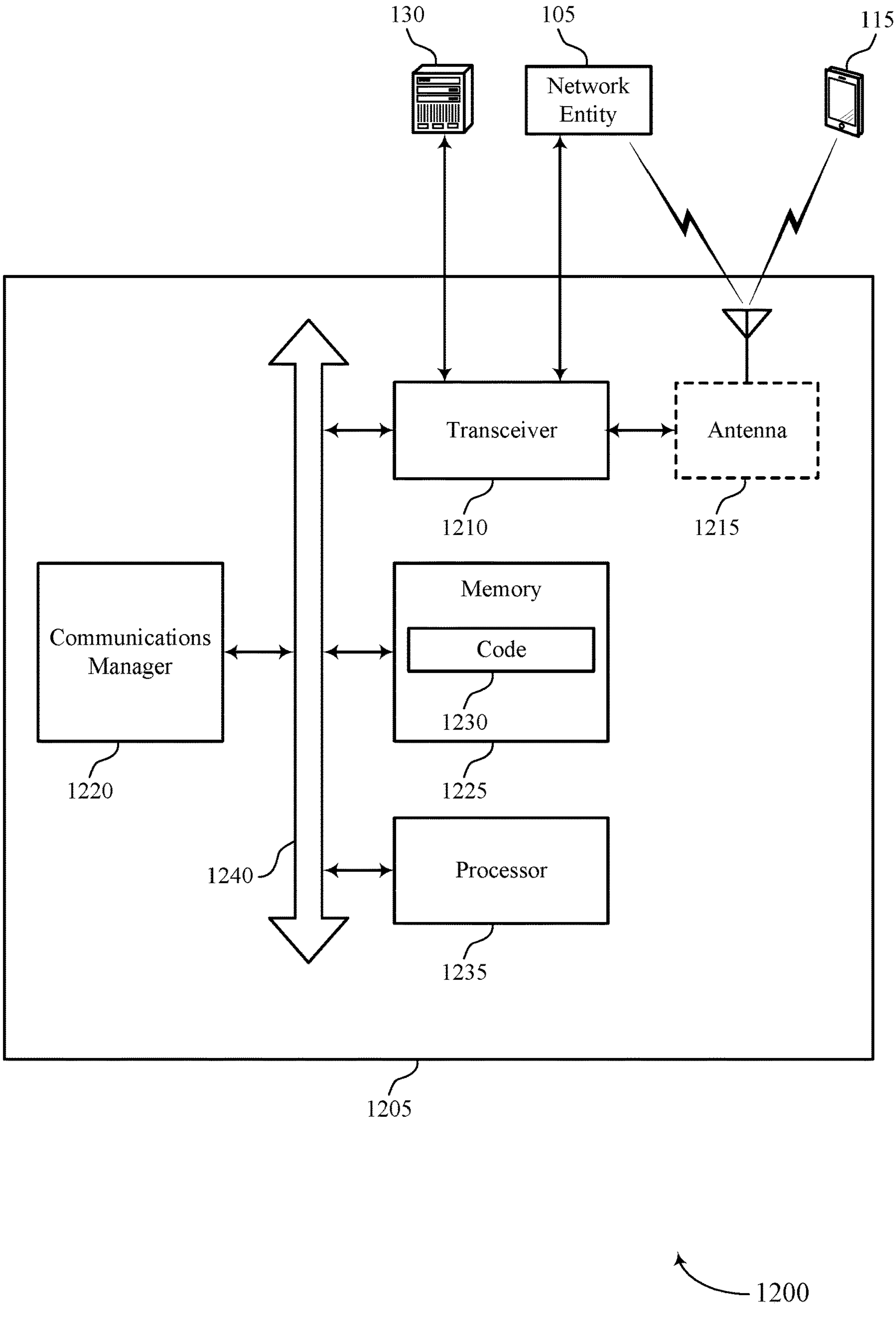
FIG. 12 shows a diagram of a system including a device that supports enhancement of UE selection for uplink aggregation in accordance with one or more aspects of the present disclosure.

FIG. 12 shows a diagram of a system 1200 including a device 1205 that supports enhancement of UE selection for uplink aggregation in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., a communication link 125, a backhaul communication link 120, a midhaul communication link 162, a fronthaul communication link 168).

The at least one memory 1225 may include RAM, ROM, or any combination thereof. The at least one memory 1225 may store computer-readable, computer-executable code 1230 including instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may contain, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting enhancement of UE selection for uplink aggregation). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

Additionally, or alternatively, the communications manager 1220 may support wireless communications in accordance with examples as disclosed herein. For example, the communications manager 1220 is capable of, configured to, or operable to support a means for transmitting, to a first UE, a spatial separation indication that indicates, for each of one or more second UEs, a spatial separation between the first UE and each respective second UE. The communications manager 1220 is capable of, configured to, or operable to support a means for receiving, from the first UE, an uplink UE aggregation request based on transmitting the spatial separation indication. The communications manager 1220 is capable of, configured to, or operable to support a means for receiving a first shared channel transmission including first data, an aggregation flag, and a sequence number from the first UE and a second shared channel transmission including second data, the aggregation flag, and the sequence number from a second UE of the one or more second UEs based at least in part on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources.

By including or configuring the communications manager 1220 in accordance with examples as described herein, the device 1205 may support techniques for reduced latency when a set of UEs are to perform uplink aggregation with the device 1205.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of enhancement of UE selection for uplink aggregation as described herein, or the at least one processor 1235 and the at least one memory 1225 may be otherwise configured to, individually or collectively, perform or support such operations.

Figure 13:
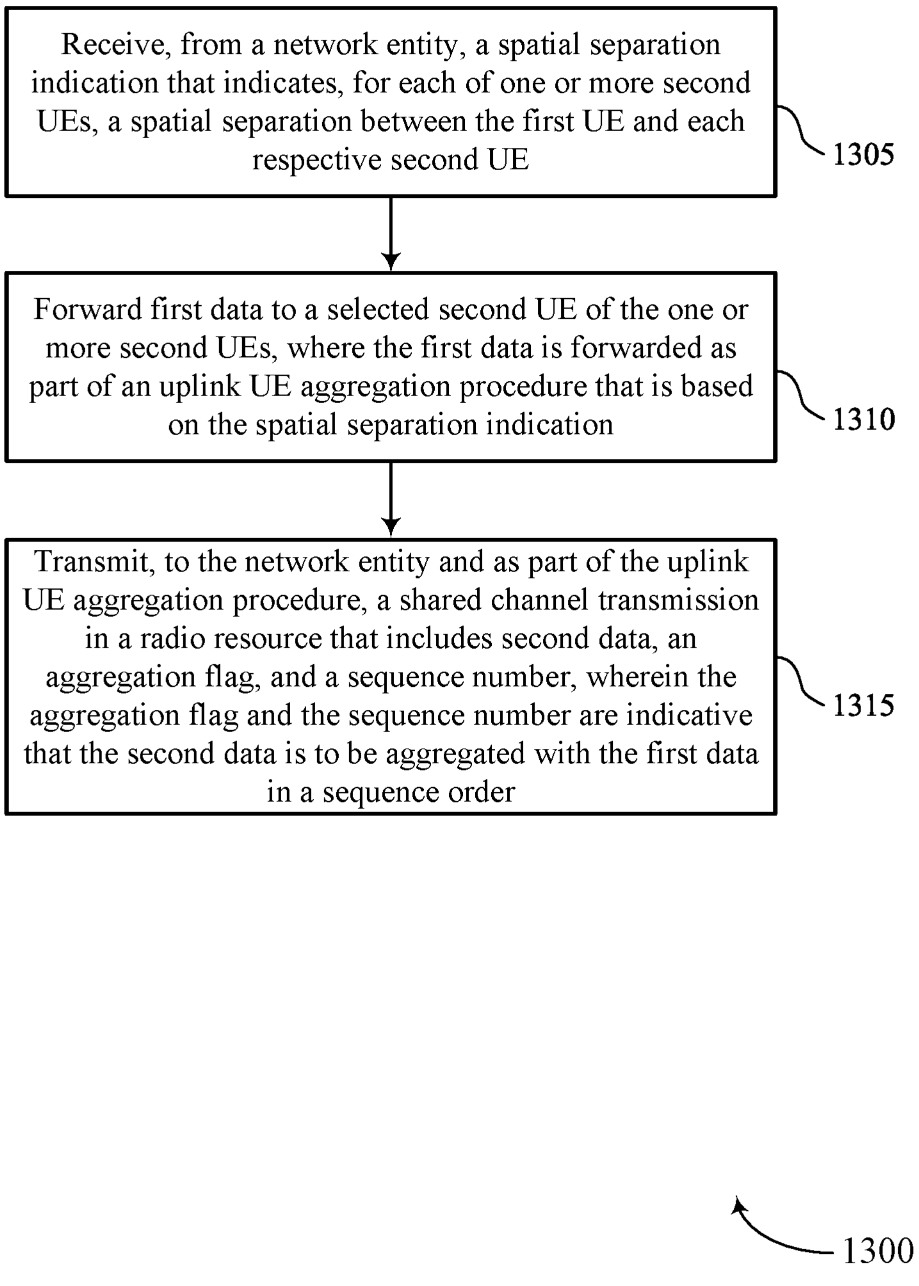
FIGS. 13 and 14 show flowcharts illustrating methods that support enhancement of UE selection for uplink aggregation in accordance with one or more aspects of the present disclosure.

FIG. 13 shows a flowchart illustrating a method 1300 that supports enhancement of UE selection for uplink aggregation in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, a spatial separation indication that indicates, for each of one or more second UEs, a spatial separation between the first UE and each respective second UE. The operations of block 1305 may be performed in accordance with examples as disclosed herein. In some examples, aspects of the operations of 1305 may be performed by a spatial separation indicator 725 as described with reference to FIG. 7.

At 1310, the method may include forwarding first data to a selected second UE of the one or more second UEs, where the first data is forwarded as part of an uplink UE aggregation procedure that is based on the spatial separation indication. The operations of block 1310 may be performed in accordance with examples as disclosed herein. In some examples, aspects of the operations of 1310 may be performed by a data forwarder 730 as described with reference to FIG. 7.

At 1315, the method may include transmitting, to the network entity and as part of the uplink UE aggregation procedure, a shared channel transmission in a radio resource that includes second data, an aggregation flag, and a sequence number, where the aggregation flag and the sequence number are indicative that the second data is to be aggregated with the first data in a sequence order. The operations of block 1315 may be performed in accordance with examples as disclosed herein. In some examples, aspects of the operations of 1315 may be performed by a shared channel transmission transmitter 735 as described with reference to FIG. 7.

Figure 14:
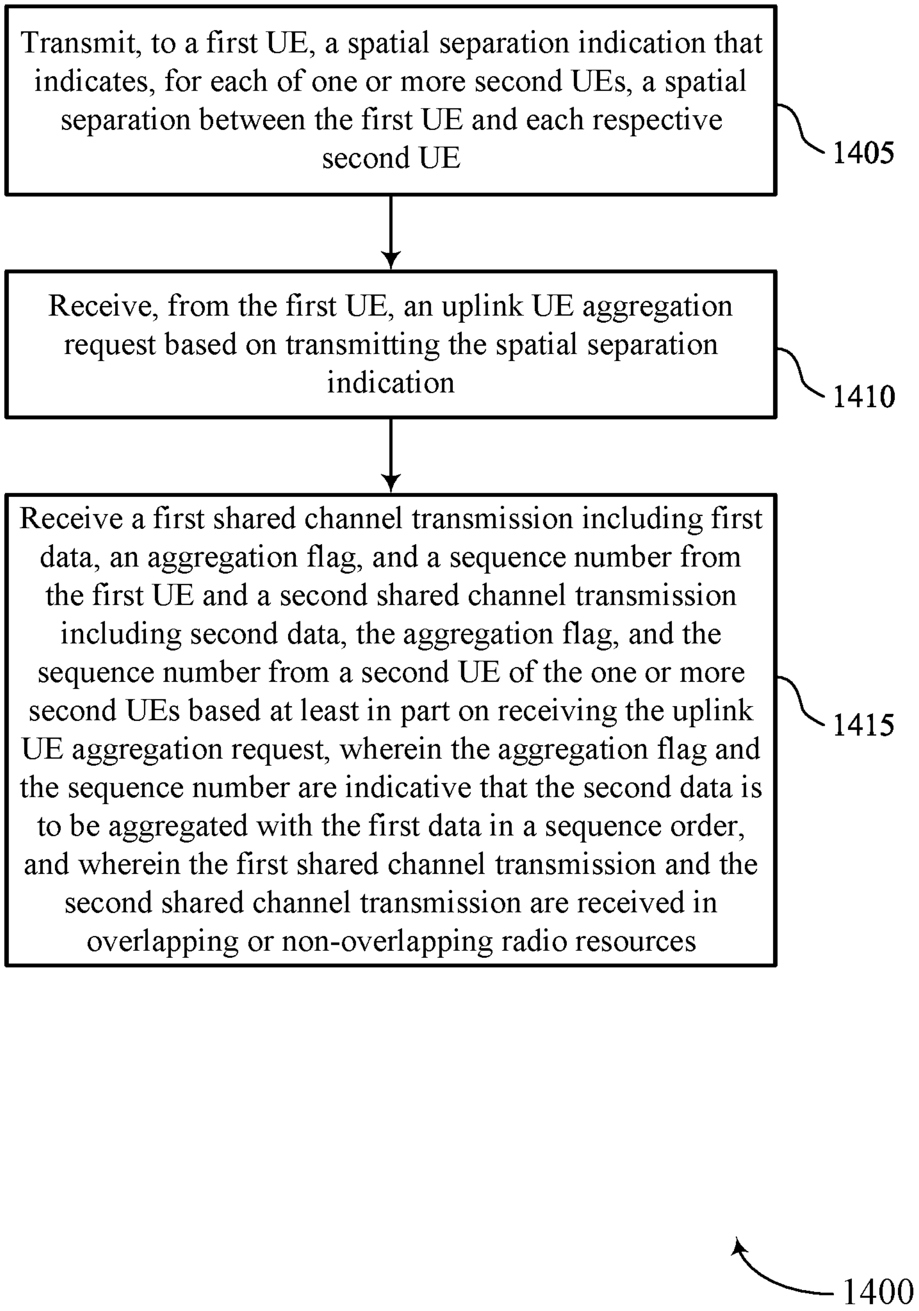

FIG. 14 shows a flowchart illustrating a method 1400 that supports enhancement of UE selection for uplink aggregation in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a first UE, a spatial separation indication that indicates, for each of one or more second UEs, a spatial separation between the first UE and each respective second UE. The operations of block 1405 may be performed in accordance with examples as disclosed herein. In some examples, aspects of the operations of 1405 may be performed by a spatial separation indication transmitter 1125 as described with reference to FIG. 11.

At 1410, the method may include receiving, from the first UE, an uplink UE aggregation request based on transmitting the spatial separation indication. The operations of block 1410 may be performed in accordance with examples as disclosed herein. In some examples, aspects of the operations of 1410 may be performed by an aggregation request receiver 1130 as described with reference to FIG. 11.

At 1415, the method may include receiving a first shared channel transmission including first data, an aggregation flag, and a sequence number from the first UE and a second shared channel transmission including second data, the aggregation flag, and the sequence number from a second UE of the one or more second UEs based at least in part on receiving the uplink UE aggregation request, where the aggregation flag and the sequence number are indicative that the second data is to be aggregated with the first data in a sequence order, and where the first shared channel transmission and the second shared channel transmission are received in overlapping or non-overlapping radio resources. The operations of block 1415 may be performed in accordance with examples as disclosed herein. In some examples, aspects of the operations of 1415 may be performed by a shared channel transmission receiver 1135 as described with reference to FIG. 11.

The following provides an overview of aspects of the present disclosure:

Aspect 1: A method for wireless communications at a first UE, comprising: receiving, from a network entity, a spatial separation indication that indicates, for each of one or more second UEs, a spatial separation between the first UE and each respective second UE; forwarding first data to a selected second UE of the one or more second UEs, wherein the first data is forwarded as part of an uplink UE aggregation procedure that is based at least in part on the spatial separation indication; and transmitting, to the network entity and as part of the uplink UE aggregation procedure, a shared channel transmission in a radio resource that includes second data, an aggregation flag, and a sequence number, wherein the aggregation flag and the sequence number are indicative that the second data is to be aggregated with the first data in a sequence order.

Aspect 2: The method of aspect 1, further comprising: determining that a quantity of data in an uplink buffer of the first UE satisfies a threshold quantity, wherein forwarding the first data is based at least in part on determining that the quantity of data in the uplink buffer satisfies the threshold quantity.

Aspect 3: The method of any of aspects 1 through 2, further comprising: transmitting, to the network entity, an indication that a quantity of data in an uplink buffer of the first UE satisfies a threshold quantity, wherein receiving the spatial separation indication is based at least in part on transmitting the indication that the quantity of data in the uplink buffer of the first UE satisfies the threshold quantity.

Aspect 4: The method of aspect 3, wherein the quantity of data in the uplink buffer satisfying the threshold quantity comprises the quantity of data in the uplink buffer exceeding the threshold quantity.

Aspect 5: The method of any of aspects 1 through 4, further comprising: selecting the selected second UE from the one or more second UEs based at least in part on the spatial separation indication; and establishing a communication link with the selected second UE based at least in part on selecting the selected second UE.

Aspect 6: The method of any of aspects 1 through 5, further comprising: transmitting, to the network entity, an uplink UE aggregation request based at least in part on the spatial separation indication, wherein transmitting the shared channel transmission is based at least in part on transmitting the uplink UE aggregation request.

Aspect 7: The method of aspect 6, further comprising: receiving an aggregation configuration from the network entity based at least in part on transmitting the uplink UE aggregation request, wherein transmitting the shared channel transmission is based at least in part on receiving the aggregation configuration.

Aspect 8: The method of any of aspects 1 through 7, wherein the spatial separation indication for the selected second UE indicates that a degree of spatial separation associated with the selected second UE exceeds a threshold amount, and the first UE forwards the first data to the selected second UE based at least in part on the degree of spatial separation exceeding the threshold amount.

Aspect 9: The method of any of aspects 1 through 8, wherein the spatial separation indication for the selected second UE indicates a degree of spatial separation associated with the selected second UE, the method further comprising: determining that the degree of spatial separation exceeds a threshold amount, wherein the first UE forwards the first data to the selected second UE based at least in part on determining that the degree of spatial separation exceeds the threshold amount.

Aspect 10: The method of aspect 9, wherein a percentage or an amount of data forwarded to the selected second UE is based at least in part on the degree of spatial separation.

Aspect 11: The method of any of aspects 1 through 10, wherein the spatial separation indication is provided via radio resource control signaling, medium access control (MAC) control element signaling, or downlink control information signaling.

Aspect 12: A method for wireless communications at a network entity, comprising: transmitting, to a first UE, a spatial separation indication that indicates, for each of one or more second UEs, a spatial separation between the first UE and each respective second UE; receiving, from the first UE, an uplink UE aggregation request based at least in part on transmitting the spatial separation indication; and receiving a first shared channel transmission including first data, an aggregation flag, and a sequence number from the first UE and a second shared channel transmission including second data, the aggregation flag, and the sequence number from a second UE of the one or more second UEs based at least in part on receiving the uplink UE aggregation request, wherein the aggregation flag and the sequence number are indicative that the second data is to be aggregated with the first data in a sequence order, and wherein the first shared channel transmission and the second shared channel transmission are received in overlapping or non-overlapping radio resources.

Aspect 13: The method of aspect 12, further comprising: receiving, from the first UE, an indication that a quantity of data in an uplink buffer of the first UE satisfies a threshold quantity, wherein transmitting the spatial separation indication is based at least in part on receiving the indication that the quantity of data in the uplink buffer of the first UE satisfies the threshold quantity.

Aspect 14: The method of aspect 13, wherein the quantity of data in the uplink buffer satisfying the threshold quantity comprises the quantity of data in the uplink buffer exceeding the threshold quantity.

Aspect 15: The method of any of aspects 12 through 14, further comprising: transmitting an aggregation configuration to the first UE based at least in part on receiving the uplink UE aggregation request, wherein receiving the first shared channel transmission from the first UE and the second shared channel transmission from the second UE is based at least in part on transmitting the aggregation configuration to the first UE.

Aspect 16: The method of any of aspects 12 through 15, wherein the second shared channel transmission comprises an identifier of the first UE, the method further comprising: combining the first data of the first shared channel transmission and the second data of the second shared channel transmission based at least in part on the identifier of the first UE and the aggregation flag.

Aspect 17: The method of any of aspects 12 through 16, wherein the spatial separation indication for the second UE indicates that a degree of spatial separation associated with the second UE exceeds a threshold amount, and receiving the first shared channel transmission from the first UE and the second shared channel transmission from the second UE is based at least in part on the degree of spatial separation exceeding the threshold amount.

Aspect 18: The method of any of aspects 12 through 17, wherein the spatial separation indication for the second UE of the one or more second UEs indicates a degree of spatial separation associated with the second UE, and receiving the first shared channel transmission from the first UE and the second shared channel transmission from the second UE is based at least in part on the spatial separation indication indicating the degree of spatial separation associated with the second UE of the one or more second UEs.

Aspect 19: The method of any of aspects 12 through 18, wherein the spatial separation indication is provided via radio resource control signaling, medium access control (MAC) control element signaling, or downlink control information signaling.

Aspect 20: A first UE for wireless communications, comprising one or more memories storing processor-executable code, and one or more processors coupled with the one or more memories and individually or collectively operable to execute the code to cause the first UE to perform a method of any of aspects 1 through 11.

Aspect 21: A first UE for wireless communications, comprising at least one means for performing a method of any of aspects 1 through 11.

Aspect 22: A non-transitory computer-readable medium storing code for wireless communications, the code comprising instructions executable by one or more processors to perform a method of any of aspects 1 through 11.

Aspect 23: A network entity for wireless communications, comprising one or more memories storing processor-executable code, and one or more processors coupled with the one or more memories and individually or collectively operable to execute the code to cause the network entity to perform a method of any of aspects 12 through 19.

Aspect 24: A network entity for wireless communications, comprising at least one means for performing a method of any of aspects 12 through 19.

Aspect 25: A non-transitory computer-readable medium storing code for wireless communications, the code comprising instructions executable by one or more processors to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:

one or more memories storing processor-executable code; and one or more processors coupled with the one or more memories and individually or collectively operable to execute the code to cause the first UE to:

receive, from a network entity, a spatial separation indication that indicates, for each of one or more second UEs, a spatial separation between the first UE and each respective second UE;

forward first data to a selected second UE of the one or more second UEs, wherein the first data is forwarded as part of an uplink UE aggregation procedure that is based at least in part on the spatial separation indication; and transmit, to the network entity and as part of the uplink UE aggregation procedure, a shared channel transmission in a radio resource that includes second data, an aggregation flag, and a sequence number, wherein the aggregation flag and the sequence number are indicative that the second data is to be aggregated with the first data in a sequence order.

2. The first UE of claim 1, wherein the one or more processors are individually or collectively further operable to execute the code to cause the first UE to:

determine that a quantity of data in an uplink buffer of the first UE satisfies a threshold quantity, wherein forwarding the first data is based at least in part on determining that the quantity of data in the uplink buffer satisfies the threshold quantity.

3. The first UE of claim 1, wherein the one or more processors are individually or collectively further operable to execute the code to cause the first UE to:

transmit, to the network entity, an indication that a quantity of data in an uplink buffer of the first UE satisfies a threshold quantity, wherein receiving the spatial separation indication is based at least in part on transmitting the indication that the quantity of data in the uplink buffer of the first UE satisfies the threshold quantity.

4. The first UE of claim 3, wherein the quantity of data in the uplink buffer satisfying the threshold quantity comprises the quantity of data in the uplink buffer exceeding the threshold quantity.

5. The first UE of claim 1, wherein the one or more processors are individually or collectively further operable to execute the code to cause the first UE to:

select the selected second UE from the one or more second UEs based at least in part on the spatial separation indication; and establish a communication link with the selected second UE based at least in part on selecting the selected second UE.

6. The first UE of claim 1, wherein the one or more processors are individually or collectively further operable to execute the code to cause the first UE to:

transmit, to the network entity, an uplink UE aggregation request based at least in part on the spatial separation indication, wherein transmitting the shared channel transmission is based at least in part on transmitting the uplink UE aggregation request.

7. The first UE of claim 6, wherein the one or more processors are individually or collectively further operable to execute the code to cause the first UE to:

receive an aggregation configuration from the network entity based at least in part on transmitting the uplink UE aggregation request, wherein transmitting the shared channel transmission is based at least in part on receiving the aggregation configuration.

8. The first UE of claim 1, wherein the spatial separation indication for the selected second UE indicates that a degree of spatial separation associated with the selected second UE exceeds a threshold amount, and the first UE forwards the first data to the selected second UE based at least in part on the degree of spatial separation exceeding the threshold amount.

9. The first UE of claim 1, wherein the spatial separation indication for the selected second UE indicates a degree of spatial separation associated with the selected second UE, and the one or more processors are individually or collectively further operable to execute the code to cause the first UE to:

determine that the degree of spatial separation exceeds a threshold amount, wherein the first UE forwards the first data to the selected second UE based at least in part on determining that the degree of spatial separation exceeds the threshold amount.

10. The first UE of claim 9, wherein a percentage or amount of data forwarded to the selected second UE is based at least in part on the degree of spatial separation.

11. The first UE of claim 1, wherein:

the spatial separation indication is provided via radio resource control signaling, medium access control (MAC) control element signaling, or downlink control information signaling.

12. A network entity, comprising:

one or more memories storing processor-executable code; and one or more processors coupled with the one or more memories and individually or collectively operable to execute the code to cause the network entity to:

transmit, to a first user equipment (UE), a spatial separation indication that indicates, for each of one or more second UEs, a spatial separation between the first UE and each respective second UE;

receive, from the first UE, an uplink UE aggregation request based at least in part on transmitting the spatial separation indication; and receive a first shared channel transmission including first data, an aggregation flag, and a sequence number from the first UE and a second shared channel transmission including second data, the aggregation flag, and the sequence number from a second UE of the one or more second UEs based at least in part on receiving the uplink UE aggregation request, wherein the aggregation flag and the sequence number are indicative that the second data is to be aggregated with the first data in a sequence order, and wherein the first shared channel transmission and the second shared channel transmission are received in overlapping or non-overlapping radio resources.

13. The network entity of claim 12, wherein the one or more processors are individually or collectively further operable to execute the code to cause the network entity to:
receive, from the first UE, an indication that a quantity of data in an uplink buffer of the first UE satisfies a threshold quantity, wherein transmitting the spatial separation indication is based at least in part on receiving the indication that the quantity of data in the uplink buffer of the first UE satisfies the threshold quantity.

14. The network entity of claim 13, wherein the quantity of data in the uplink buffer satisfying the threshold quantity comprises the quantity of data in the uplink buffer exceeding the threshold quantity.

15. The network entity of claim 12, wherein the one or more processors are individually or collectively further operable to execute the code to cause the network entity to:
transmit an aggregation configuration to the first UE based at least in part on receiving the uplink UE aggregation request, wherein receiving the first shared channel transmission from the first UE and the second shared channel transmission from the second UE is based at least in part on transmitting the aggregation configuration to the first UE.

16. The network entity of claim 12, wherein the second shared channel transmission comprises an identifier of the first UE, and the one or more processors are individually or collectively further operable to execute the code to cause the network entity to:
combine the first data of the first shared channel transmission and the second data of the second shared channel transmission based at least in part on the identifier of the first UE and the aggregation flag.

17. The network entity of claim 12, wherein the spatial separation indication for the second UE indicates that a degree of spatial separation associated with the second UE exceeds a threshold amount, and receiving the first shared channel transmission from the first UE and the second shared channel transmission from the second UE is based at least in part on the degree of spatial separation exceeding the threshold amount.

18. The network entity of claim 12, wherein the spatial separation indication for the second UE of the one or more second UEs indicates a degree of spatial separation associated with the second UE, and receiving the first shared channel transmission from the first UE and the second shared channel transmission from the second UE is based at least in part on the spatial separation indication indicating the degree of spatial separation associated with the second UE of the one or more second UEs.

19. The network entity of claim 12, wherein:
the spatial separation indication is provided via radio resource control signaling, medium access control (MAC) control element signaling, or downlink control information signaling.

20. A method for wireless communications at a first user equipment (UE), comprising:
receiving, from a network entity, a spatial separation indication that indicates, for each of one or more second UEs, a spatial separation between the first UE and each respective second UE;
forwarding first data to a selected second UE of the one or more second UEs, wherein the first data is forwarded as part of an uplink UE aggregation procedure that is based at least in part on the spatial separation indication; and
transmitting, to the network entity and as part of the uplink UE aggregation procedure, a shared channel transmission in a radio resource that includes second data, an aggregation flag, and a sequence number, wherein the aggregation flag and the sequence number are indicative that the second data is to be aggregated with the first data in a sequence order.

* * * * *